(12) United States Patent
Wu et al.

(10) Patent No.: US 12,704,985 B2
(45) Date of Patent: Aug. 11, 2026

(54) METHODS AND APPARATUS FOR AN ADAPTIVE AND SERVICE LEVEL AGREEMENT AWARE PAGING SYSTEM

(71) Applicant: Cloudera, Inc., Santa Clara, CA (US)

(72) Inventors: Yida Wu, Seattle, WA (US); Abhishek Rawat, San Jose, CA (US); Vincent Kulandaisamy, Lakeway, TX (US)

(73) Assignee: Cloudera, Inc., Santa Clara, CA (US)

( * ) Notice: Subject to any disclaimer, the term of this patent is extended or adjusted under 35 U.S.C. 154(b) by 0 days.

(21) Appl. No.: 18/436,810

(22) Filed: Feb. 8, 2024

(65) Prior Publication Data

US 2025/0103229 A1 Mar. 27, 2025

Related U.S. Application Data

(60) Provisional application No. 63/585,879, filed on Sep. 27, 2023.

(51) Int. Cl.
*G06F 3/06* (2006.01)

(52) U.S. Cl.
CPC ............ *G06F 3/064* (2013.01); *G06F 3/0604* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 8,843,459 | B1 * | 9/2014 | Aston | G06F 3/0643 709/224 |
| 2011/0167239 | A1 * | 7/2011 | Horn | G06F 11/34 711/170 |
| 2016/0034527 | A1 * | 2/2016 | Barber | G06F 16/24554 707/693 |
| 2017/0357456 | A1 * | 12/2017 | DeFilippi | G06F 3/065 |
| 2018/0292897 | A1 * | 10/2018 | Wald | G06F 3/011 |
| 2018/0300067 | A1 * | 10/2018 | Mittal | G06F 3/0631 |
| 2020/0042221 | A1 * | 2/2020 | Zhuang | G06F 3/0631 |
| 2021/0191942 | A1 * | 6/2021 | Arnold | G06F 16/24553 |
| 2022/0405289 | A1 * | 12/2022 | Beier | G06F 16/258 |
| 2023/0418827 | A1 * | 12/2023 | Kondiles | G06F 16/24542 |

* cited by examiner

*Primary Examiner* — Jared I Rutz
*Assistant Examiner* — Alexander J Yoon
(74) *Attorney, Agent, or Firm* — Hanley, Flight & Zimmerman, LLC

(57) ABSTRACT

Examples disclosed herein include writing pages of data to blocks, the data associated with an operator; writing the blocks to a file based on a sequential arrangement of the data in the blocks; writing the file to a spill data store; and executing an instruction by programmable circuitry to batch read the blocks in sequential order from the spill data store to a local memory.

22 Claims, 11 Drawing Sheets

METHODS AND APPARATUS FOR AN ADAPTIVE AND SERVICE LEVEL AGREEMENT AWARE PAGING SYSTEM

RELATED APPLICATIONS

This patent arises from a patent application that claims the benefit of U.S. Provisional Patent Application No. 63/585,879, filed Sep. 27, 2023, and is entitled "Methods and Apparatus for an Adaptive and Service Level Agreement Aware Paging System." U.S. Provisional Patent Application No. 63/585,879 is hereby incorporated herein by reference in its entirety.

FIELD OF THE DISCLOSURE

This disclosure relates generally to computing systems and, more particularly, to methods and apparatus for an adaptive and service level agreement (SLA) aware paging system.

BACKGROUND

Computers store information in memory and/or storage devices. The information is organized in a manner that allows users or processes to subsequently access the information. To store information exceeding a capacity of local memory, such information can be offloaded to off-device storage for later retrieval.

Figure 1:
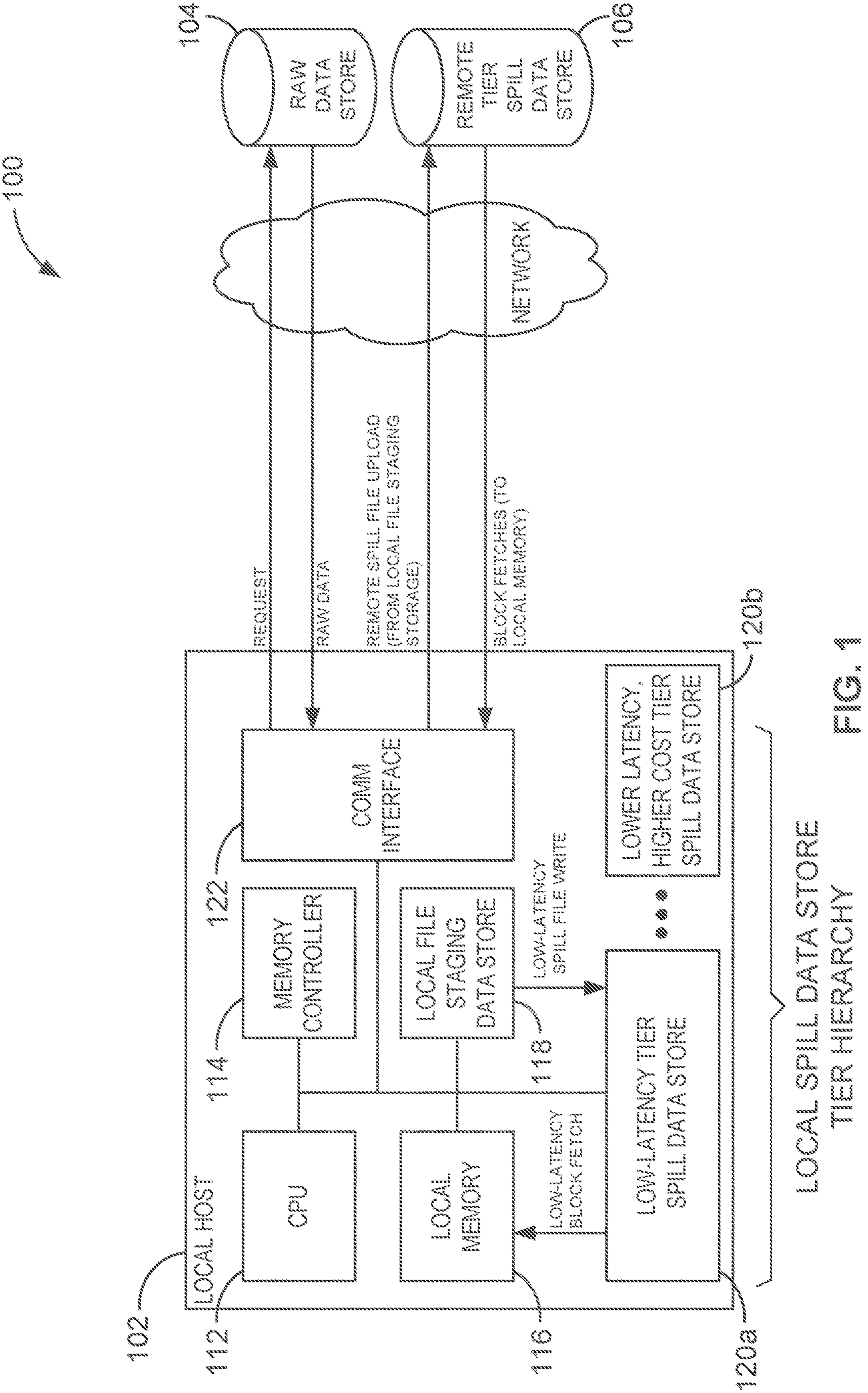
FIG. 1 is a block diagram of an example environment in which examples disclosed herein may be implemented.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

In examples disclosed herein, task execution in a computational system involves systematic transformation of input data or requests into meaningful outputs through a series of organized steps, which may include subtasks or operators. Task execution also involves deciding how to use computers in a cluster. For example, task execution involves allocating computer resources (e.g., central processor unit (CPU) resources, graphics processor unit (GPU) resources, memory resources, storage resources, etc.), whether the work is centralized or distributed across a network of computers. Task execution also involves carrying out tasks in a step-by-step manner on one computer or on multiple computers in a distributed system. In addition, task execution involves handling errors or unusual situations, including decisions to report errors or apply secondary solutions to continue a process. An example secondary solution includes using a secondary tier resource if a primary tier resource is at capacity. Results of a task execution can be aggregated to produce final results to be output from a single or multiple machines.

Examples disclosed herein may be used to implement an adaptive and service level agreement (SLA) aware paging system that uses secondary tier characteristics to satisfy SLA requirements of applications. Example secondary tiers may include memory or storage to which in-memory data is paged out. For example, examples disclosed herein may be used to perform batch reading of spilled data from remote storage for queries in cloud environments. Cloud-based data systems are often used to store large amounts of raw data and perform data queries. For example, the raw data may be stored in cloud storage and organized in a manner to facilitate its mining through queries initiated by client devices. Query results of the raw data returned from the cloud storage can then be stored locally in local memory of a client device (e.g., a local host) for analysis and/or processing (e.g., formatting, applying filters, creating graphs, generating trends, etc.). In this manner, operators (e.g., structured query language (SQL) operators or any other suitable data processing operators) can be applied to the originally returned raw data to generate intermediate data that suits the needs of a consumer or client (e.g., a data requestor) at the requesting client device. The original raw data typically goes through several stages of transformation and processing (e.g., typically there is an operator for each stage of data processing) to return the desired results to the client device. Each operator typically converts data into its intermediate representation for producing results to be consumed by the next operator, in a pipeline fashion.

Since the capacity of local memory is finite, and operators need to operate within their assigned memory limits (e.g., an amount of memory space allocated in local memory to an operator), an operator partitions its input data (e.g., intermediate data from a previous operator operation and/or raw data) and processes the partitions which can fit in its memory limit. The remaining partitions of its input data are spilled (e.g., moved out of, written out of, etc.) to secondary memory or storage tiers (e.g., a hierarchy of secondary memory or storage tiers) with larger capacities until the operators are available to process the remaining data. For example, after an operator has processed in-memory partitions of its input data, it loads one or more other partitions of its input data from the secondary tiers and repeats the process until it has processed all its partitions of input data.

Access speeds of larger capacity spill storage are slower than access speeds of local memory. However, the larger capacity spill storage allows for storing more raw data and/or intermediate data than local memory and allows storing such data for longer durations so that local memory can be freed up for other uses. Example intermediate data may be based on raw data that has been organized in accordance with any formatting, filtering, trending, calculations, and/or any other processing applied to the originally returned raw data. Additionally or alternatively, the larger capacity spill storage allows for storing raw or intermediate data so that a previously run query does not need to be re-run to retrieve the same raw or intermediate data from a raw data store (e.g., accessing a cloud provider's application programming interface (API) may incur a fee per query). In any case, data stored in a spill data store is referred to herein as spilled data. As such, spilled data may include raw data and/or intermediate data. To subsequently access the spilled data from the spill data store, a client device may send a read request to the spill data store to read back spilled data of interest. To use network resources more efficiently, the spilled data may be read back in batches of pages (e.g., on a block basis under which each block includes multiple pages) as disclosed herein.

Examples disclosed herein employ a spill manager that can efficiently read pages in batches from a spill data store, thereby reducing remote input-output (I/O) communications. Such a spill manager facilitates batch reading by writing data into specific remote blocks and files. In examples disclosed herein, a batch is also referred to as a block because a block may include multiple pages. As such, a batch read or a block read involves reading back multiple pages in a block or batch. Block-based batch reading from a spill data store into local memory in this manner (e.g., reading by blocks instead of individual pages) uses resources (e.g., memory resources, local/remote storage resources, network resources, etc.) more efficiently than other techniques. Such batch reading also improves performance of applications that spill data to secondary tiers of memory or storage. For example, after the blocks are read from the local memory by the consumer that requested them, the blocks can be evicted from the local memory thereby freeing up memory resources for other uses. To further reduce remote I/O operations, examples disclosed herein group spilled data in blocks and files in accordance with a cross-data relevancy organization such that data stored proximate one another is closely related. In such a cross-data relevancy organization, a read request for a particular data block is likely to be followed by a subsequent read request for a neighboring data block. In this manner, based on data store locality of the cross-data relevancy organization of blocks and files in a spill data store, the batch reads of examples disclosed herein may be used to prefetch data that is likely to be subsequently requested.

Examples disclosed herein may be used with any workload that analyzes data sets. In some examples, techniques disclosed herein may be used to execute workloads with large working sets that do not fit in main memory and local storage. For example, a remote cloud object store like the Amazon® Simple Storage Service (S3) may be more cost effective for offloading data storage needs than locally mounted network storage like the Amazon Elastic Block Storage (EBS) and the Amazon Elastic File System (EFS). Examples disclosed herein consider that remote I/O can be slower than local I/O and determine how to store and read spilled data efficiently. Examples disclosed herein also determine how to store and read spilled data to meet service level agreement (SLA) requirements. As such, examples disclosed herein may be used to optimize the price-performance of using remote object storage for storing spilled data.

FIG. 1 is a block diagram of an example environment 100 in which examples disclosed herein may be implemented. The example environment includes a local host 102 (e.g., a client device) that is in network communication with a raw data store 104 and a remote tier spill data store 106 via a network 108 (e.g., the Internet). The example local host 102 includes a central processing unit (CPU) 112, a memory controller 114, a local memory 116, a local file staging data store 118, a low-latency tier spill data store 120*a*, a lower-latency, higher cost tier spill data store 120*b*, and a communication interface 122.

The example CPU 112 represents one or more processors to execute machine-readable instructions that may be used to implement examples disclosed herein. The example memory controller 114 is provided to control data access operations to read, write, and/or modify data in the local memory 116, the local file staging data store 118, the low-latency tier spill data store 120*a*, and the lower-latency, higher cost tier spill data store 120*b*. The example local memory 116 may be implemented using volatile read/write memory such as dynamic RAM (DRAM), static RAM (SRAM), Synchronous DRAM (SDRAM), RAMBUS® DRAM (RDRAM®), and/or any other type of RAM device. The example local file staging data store 118 (e.g., a local tier) may be implemented using non-volatile storage such as a solid-state drive (SSD), a magnetic hard disk drive (HDD), flash memory, and/or any other type of non-volatile storage. The example low-latency tier spill data store 120*a* (e.g., a secondary tier) may be implemented using a non-volatile memory express (NVMe) device and/or any other type of low-latency non-volatile data storage device. The example low-latency tier spill data store 120*a* provides an option to store frequently accessed spilled data locally in the local host 102 while storing less frequently accessed spilled data remotely in the remote tier spill data store 106 (e.g., a secondary tier). The lower-latency, higher cost tier spill data store 120*b* may also be implemented using NVMe device or any other suitable storage device. However, the NVMe device or other suitable storage device that implements the lower-latency, higher cost tier spill data store 120*b* has a lower latency than the low-latency tier spill data store 120*a* and, as such, incurs a higher cost than the low-latency tier spill data store 120*a*. In examples disclosed herein, the low-latency tier spill data store 120*a* and the lower-latency, higher cost tier spill data store 120*b* are collectively referred to herein as the low-latency tier spill data store 120. As such, reference to the low-latency tier spill data store 120 in this disclosure may refer to a single one of the spill data stores 120*a*, 120*b* or both of the spill data stores 120*a*, 120*b*. However, examples disclosed herein may be adapted to employ multiple other low-latency tier spill data stores (e.g., in addition to or instead of the spill data stores 120*a*, 120*b*) having different performance characteristics such that different ones of the multiple other low-latency tier spill data stores may be selected to store spilled data based on their performance characteristics. The example communication interface 122 may be implemented using any suitable network interface to communicate over the Internet, a cellular data network, a satellite data network, etc.

The example raw data store 104 is a cloud-based storage resource that stores raw data corresponding to any topic of interest. Example raw data could include sales data, purchasing data, marketing data, financial data, medical patient data, infectious disease data, engineering data, network traffic data, employment data, and/or any other data that an entity may wish to mine and/or analyze (e.g., big data). Although a single raw data store 104 is shown, examples disclosed herein may be implemented in connection with multiple raw data stores 104. In some examples, multiple raw data stores store the same data so that the data can be accessed in parallel by the same client device that uses multiple process threads to issue queries concurrently. Alternatively, the multiple raw data stores can service queries in parallel from multiple different client devices. In some examples, the raw data store 104 and the remote tier spill data store 106 can be combined (e.g., implemented as a single data store).

The example remote tier spill data store 106 is a cloud-based storage resource that stores spilled data (e.g., data paged out) from the local host 102 to free up memory capacity in the local memory 116 of the local host 102. For example, the example local host 102 sends requests for raw data (e.g., queries, fetch requests, etc.) to the raw data store 104 and receives raw data from the raw data store 104 in response to the requests. The example local host 102 can then execute one or more operators to perform one or more data processing operations (e.g., formatting, applying filters, creating graphs, generating trends, etc.) on the raw data when stored in the local memory 116 to generate intermediate data. However, since the memory capacity of the local memory 116 is finite and the amount of or volume of raw data and/or intermediate data may exceed a memory space allocation of the one or more operators, the raw data and/or intermediate data is evicted or spilled from the local memory 116 to the spill data store 106, 120 to free up space in the local memory 116 until the one or more operators are available to process the raw data and/or further process the intermediate data. In example FIG. 1, the local host 102 may cause the writing of spilled data (e.g., paging out data) to the remote tier data store 106 or a low-latency tier spill data store 120 depending on read-back speeds targeted for the spilled data. For example, more frequently accessed spilled data may be written to (e.g., paged out to) a low-latency tier spill data store 120 to reduce data access latencies for frequently occurring data accesses. In contrast, less frequently accessed spilled data may be written to (e.g., paged out to) the remote tier spill data store 106 based on less frequently occurring data accesses having less of a performance impact because corresponding higher-latency data accesses will be requested less often. In addition, examples disclosed herein may be implemented with a hierarchy of multiple local tier spill data stores that includes the low-latency tier spill data store 120*a* and/or the lower-latency, higher cost tier spill data store 120*b*. In such instances, different ones of the local tier spill data stores may have different I/O characteristics, different latency characteristics, and/or differences in any other performance characteristics. For example, some local tier spill data stores may have lower latencies and a higher cost and other local tier spill data stores may have higher latencies and a lower cost. As such, one of the multiple local tier spill data stores in the hierarchy may be selected to store spilled data locally based on its characteristics satisfying store/access requirements (e.g., SLA requirements) of the spilled data.

The example remote tier spill data store 106 may be implemented using any suitable cloud-based storage resource (e.g., Amazon® Simple Storage Service (S3), Microsoft® Azure® Blob File System (ABFS), etc.). Although one remote tier spill data store 106 is shown, in other examples multiple remote tier spill data stores may be used. For example, multiple remote tier spill data stores may enable parallel data accesses to increase data access speeds. Multiple remote tier spill data stores may also be implemented as sub-tiers having different latencies and/or different quality of service (QoS) levels. For example, a lower-latency, high QoS remote tier spill data store may be used for spilled data that is accessed remotely using a relatively higher frequency than spill data stored in a higher-latency, lower QoS remote tier spill data store. In addition, examples disclosed herein may be implemented with a hierarchy of multiple remote tier spill data stores that includes the remote tier spill data store 106. In such instances, different ones of the remote tier spill data stores may have different I/O characteristics, different latency characteristics, and/or differences in any other performance characteristics. For example, some remote tier spill data stores may have lower latencies and a higher cost and other remote tier spill data stores may have higher latencies and a lower cost. As such, one of the multiple remote tier spill data stores in the hierarchy may be selected to store spilled data remotely based on its characteristics satisfying store/access requirements (e.g., SLA requirements) of the spilled data.

For improved efficiencies of local data store accesses and network resource usage, spilled data may be organized and written to the data stores 106, 120 in accordance with examples disclosed herein. For example, techniques disclosed herein group spilled data in blocks and files in accordance with a cross-data relevancy organization such that data stored proximate one another is closely related (e.g., a data objects relationship). In such a cross-data relevancy organization (e.g., an organization of data according to data objects relationships), a read request for a particular data block from a spill data store 106, 120 is likely to be followed by a subsequent read request for a neighboring data block in the same spill data store 106, 120. In this manner, based on data store locality of the cross-data relevancy organization of blocks and files in the spill data store 106, 120, batch reads in accordance with examples disclosed herein may be used to prefetch data that is likely to be subsequently requested.

Figure 2:
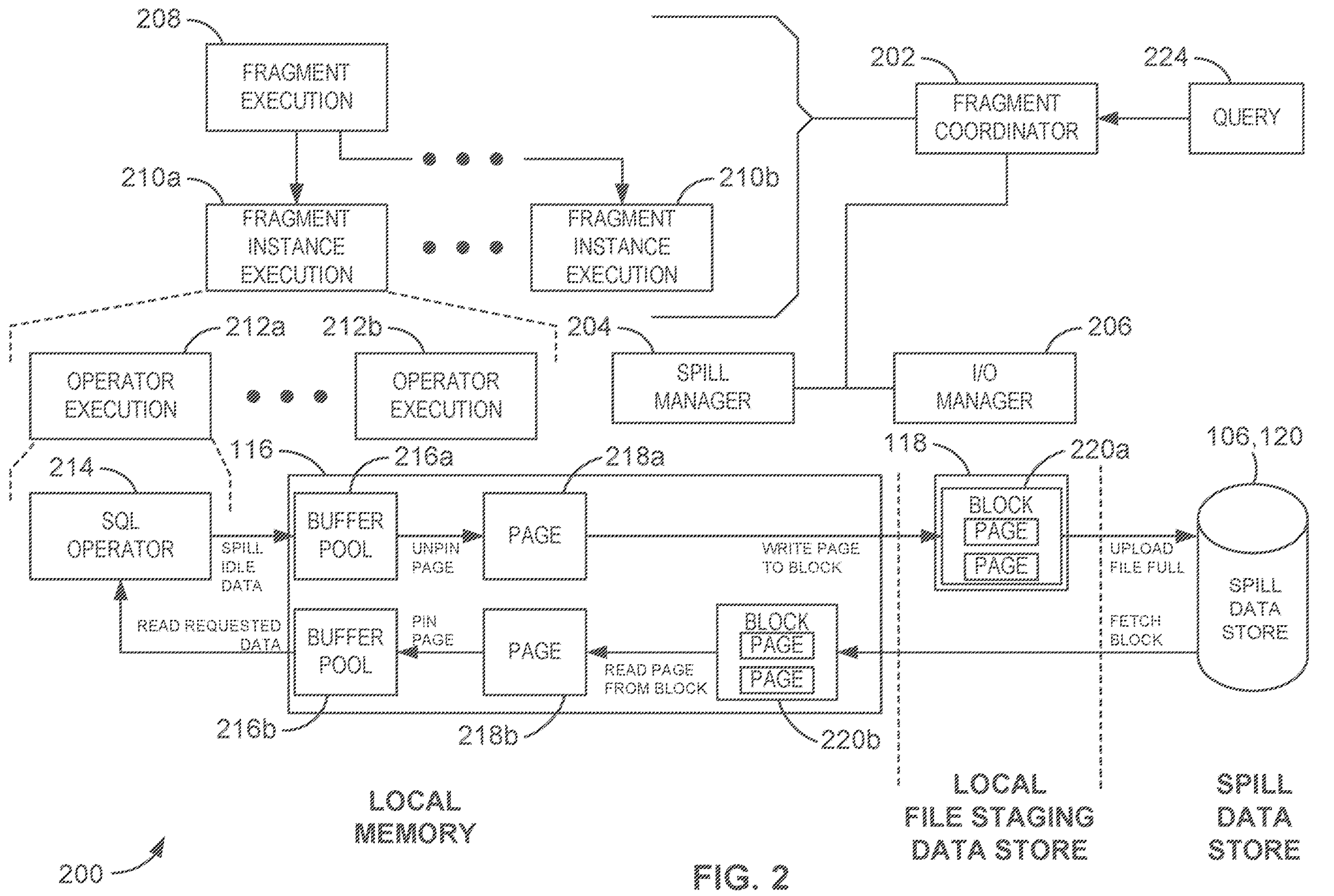
FIG. 2 is a block diagram of an example implementation of an adaptive and/or SLA-aware paging system that includes an example spill manager and an example input-output (IO) manager to perform writes of spilled data to and batch reads of the spilled data from one or more spill data stores in the environment of FIG. 1.

FIG. 2 is a block diagram of an example implementation of an adaptive and/or SLA-aware paging system 200 that includes an example fragment coordinator 202, an example spill manager 204, and an example input-output (I/O) manager 206 to perform writes and batch reads of spilled data from one or more spill data stores in the environment 100 of FIG. 1. In some examples, the spill manager 204 and the I/O manager 206 may be combined. The example fragment coordinator 202, the example spill manager 204, and the example I/O manager 206 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the example fragment coordinator 202, the example spill manager 204, and the example I/O manager 206 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

Example FIG. 2 also includes a fragment execution process 208, fragment instance execution processes 210*a*, 210*b*, operator execution processes 212*a*, 212*b*, and a structured query language (SQL) operator 214. Example FIG. 2 also includes buffer pools 216*a*, 216*b* in the local memory 116 and pages 218*a*, 218*b*. Example FIG. 2 also includes block 220*a* in the local file staging data store 118 and block 220*b* in the local memory 116.

The example fragment coordinator 202 receives a query 224 (e.g., a query generated by a client device of a data consumer) and processes the query 224 to be serviced as multiple fragment tasks. To service the query 224, the example fragment coordinator 202 generates a query plan. For example, the query plan may include multiple fragment tasks (e.g., query fragment tasks), which are logical units of data processing. A fragment task consumes data from one or more downstream fragment tasks and produces data for one or more upstream fragment tasks. In addition, a fragment task may contain multiple operators that consume data from one or more downstream operators and produce data for one or more upstream operators. In examples disclosed herein, an operator is a smallest unit of data processing. The example fragment coordinator 202 parses the query 224 into smaller fragment tasks so that each fragment task can be executed by a separate process thread, thereby benefiting from parallelism by executing multiple fragment tasks concurrently.

The example fragment coordinator 202 schedules and admits the query 224 based on the query plan with requested resources such as memory, storage, CPU, GPU, etc. Generation and execution of the query plan is represented in FIG. 2 as the example fragment execution 208. To prepare for the fragment execution process 208, the fragment coordinator 202 parses the query 224 into multiple fragment tasks to be executed as the fragment instance execution processes 210*a*, 210*b*. For example, the multiple fragment tasks may be executed by multiple computers of a cluster to scan/request different parts of requested data in parallel. In some examples, each compute instance executes multiple fragment tasks using symmetric multiprocessing (SMP) parallelism. For example, fragment tasks in a parallel portion of the query plan can be executed in parallel. In some examples, the multiple computers can execute corresponding fragment tasks to request respective portions of the data from disparate raw data stores (e.g., the raw data store 104 of FIG. 1 and one or more other raw data stores) and/or different raw data storage volumes. After this fragment-based processing, the fragment execution process 208 also includes the fragment coordinator 202 coordinating the fragment task results to present aggregated or combined query results to the requestor (e.g., a client, a consumer, etc.) of the query results. In some examples, the fragment coordinator 202 is circuitry instantiated by programmable circuitry executing fragment coordinator instructions and/or configured to perform operations such as those represented by the flowchart(s) of FIG. 6A and/or FIG. 6B.

The example operator execution processes 212*a*, 212*b* represent executions of corresponding operators (e.g., SQL operators). For example, the operator execution process 212*a* is provided to execute the corresponding SQL operator 214 on its input data (e.g., intermediate data from a previous operator operation and/or raw data) and generate intermediate data. The example SQL operator 214 may be a scanning function, a group-by function, an aggregate function, a hash join function, a sort function, a hash function, a filter function, etc. Although the SQL operator 214 is shown, examples disclosed herein may be used with any other suitable types of operators.

In examples disclosed herein, operators are assigned resource limits (e.g., memory limits, storage limits, CPU limits, GPU limits, etc.). However, resource limits may be relatively small for some compute instances. For example, compute instances in a cloud typically have small storage capacities since a local storage resource is shared by all queries. Since memory is not a compressible resource, if an operator cannot contain data in its assigned memory limit, the operator spills data into a secondary tier (e.g., the spill data store 106, 120). For example, a SQL operator such as the example SQL operator 214 includes a "spill idle data" instruction (e.g., a spill instruction) to cause the spill manager 204 to spill data from the local memory 116 for writing to the spill data store 106, 120. In examples disclosed herein, the fragmenting of the query 224 into fragment tasks may be used to organize the corresponding raw data results into corresponding pages such as page 218*a* of FIG. 2 and/or corresponding blocks such as block 220*a* of FIG. 2. For example, first raw data and second raw data from a fragment task may be related data (e.g., they have a data objects relationship) that will be consecutively or sequentially accessed by the SQL operator 214 when the SQL operator 214 is ready to process the first and second raw data. Examples disclosed herein may use such an access pattern to determine a write pattern. After writing the first raw data to page 218*a* of block 220*a*, if the page 218*a* is not full, the second raw data is written to the same page 218*a*. If the page 218*a* is full and the block 220*a* still has space for a new page, the second raw data is written to a new page in the block 220*a*. This write pattern strategy can be used to improve data access efficiency during a reading process when fetching block 220*a* to the local memory 116 because it allows for fetching two consecutive pages simultaneously in the same block 220*a* from the spill data store 106, 120. Alternatively, if the page 218*a* is full and the block 220*a* is full, a new block is created. Under such circumstances, the second raw data is written to a next page in the newly created block, which sequentially follows the block 220*a*. In this manner, the page 218*a* and the next page can be organized in a page-block arrangement so that an access request for the block 220*a* including the page 218*a* can trigger a prefetch of the next block including the next page that stores the data related to the page 218*a*. In such an example, the block 220*a* can be assigned block ID 0 and the next block can be assigned a sequentially subsequent block identifier of block ID 1. Using this sequential block identifier arrangement for the related data, a request to access block ID 0 triggers a prefetch of block ID 1.

The example spill manager 204 and/or the example I/O manager 206 can efficiently page out data (e.g., write pages) in batches (e.g., blocks) to remote storage (e.g., the spill data store 106, 120) and read pages in batches (e.g., blocks) from remote storage (e.g., the spill data store 106, 120) into the local memory 116, thereby reducing remote I/O traffic, as described below. By reading blocks back from remote storage directly to the local memory 116 of the local host 102, instead of writing them into a local storage device, the readback of the blocks is substantially faster because writing to the local memory 116 is faster than writing to local storage. In addition, batch reading (or block reading) accelerates the network transfer per base unit. In some examples, the spill manager 204 and/or the I/O manager 206 write(s) data into specific remote blocks and files. After blocks are read from the local memory 116 by a consumer or client (e.g., a data requestor) which requested them, the blocks can be evicted from the local memory 116, thereby freeing up memory resources for other uses. As also described below, related blocks can be prefetched to further reduce remote I/O traffic. That is, related blocks of data can be stored within storage area proximity of one another. Through this locality of related data, the prefetching of related blocks results in using memory and network resources more efficiently To write the page 218*a* of the spilled data from the buffer pool 216*a* to the local file staging data store 118, the example spill manager 204 unpins the page 218*a* and causes the unpinned page 218*a* to be written to a block 220*a* in the local file staging data store 118. After the example I/O manager 206 receives a "write page to block" request from the spill manager 204, the I/O manager 206 writes the page 218*a* of spilled data into the block 220*a*.

As shown in example FIG. 2, the spill manager 204 organizes multiple pages into a single block 220*a*. In this manner, examples disclosed herein may be used to batch write multiple pages in a single block to the spill data store 106, 120 and batch read multiple pages in a single block from the spill data store 106, 120. The example spill manager 204 organizes the pages of spilled data in the block 220*a* and multiple blocks into a file based on cross-data relevancy (e.g., data objects relationships). In this manner, pages of spilled data stored proximate one another are closely related. The example spill manager 204 uses this kind of cross-data relevancy organization when writing files of blocks to the spill data store 106, 120 so that a subsequent read request for a particular page of spilled data from the spill data store 106, 120 is likely to be accompanied by neighboring pages of spilled data that is likely to be requested soon after. In this manner, based on data store locality of the cross-data relevancy organization of pages, blocks, and files in the spill data store 106, 120, batch reads in accordance with examples disclosed herein may be used to prefetch data that is likely to be subsequently requested. This improves read-back performance when reads are performed synchronously from the spill data store 106, 110, or at least substantially reduces or eliminates degradation of synchronous read-back performance. As described above, such batch reading is also referred to as block reading in examples disclosed herein. In some examples, the spill manager 204 is circuitry instantiated by programmable circuitry executing spill manager instructions and/or configured to perform operations such as those represented by the flowchart(s) of FIG. 6A and/or FIG. 6B.

In example FIG. 2, blocks of spilled data are written in files. For example, a file may include one or more blocks. When the file is full and the local file staging data store 118 is nearing capacity, the I/O manager 206 executes an "upload file full" instruction to write the full file to the spill data store 106, 120. The file(s) to be uploaded could be determined based on SLA characteristics of its data or other data victimization technique such as LRU (Least Recently Used) or any other suitable process that selects data to be evicted (e.g., a victim) as spilled data. As such, the local file staging data store 118 maintains files of blocks that have been spilled from the local memory 116. When all the pages within a block have been written or the block is marked as full, the block is considered full. When a threshold number of blocks have been written to the file and all blocks are full, the file is considered full. The threshold number defining how many blocks can be written to a file may be selected by a process and/or a user. In some examples, the threshold number of blocks may be based on a target file write performance that represents how fast an entire file can be written to the spill data store 106, 120. Decreasing the threshold number of blocks to decrease a file write duration may allow other pending processes to access the spill data store 106, 120 between multiple file uploads. However, it requires the I/O manager 206 to more frequently initiate those file uploads. Increasing the threshold number of blocks to increase the file write duration may increase the pendency of other operations waiting to access the spill data store 106, 120. However, it decreases the frequency of file uploads initiated by the I/O manager 206. In some examples, the I/O manager 206 is circuitry instantiated by programmable circuitry executing I/O manager instructions and/or configured to perform operations such as those represented by the flowchart(s) of FIG. 6A and/or FIG. 6B.

In some examples, the threshold number of blocks is not static or fixed. Instead, the threshold number of blocks can be dynamically selected on a file-by-file basis. For example, such dynamic number of blocks per file can be useful to accommodate localizing more related data in a single file or across fewer files. Such data localization in a file may be selected based on data access patterns and data organization of the spilled data. Similarly, block sizes can be dynamically selected on a per-operator basis (e.g., a block size for use by the SQL operator 214 may be determined by the SQL operator 214) to accommodate characteristics or data needs of a particular operator. In some examples, block size may be determined to accommodate different quantities of related data in fewer blocks, thereby increasing data localization when the block(s) are stored in a file and uploaded to the spill data store 106, 120. Block size may also be selected based on data access patterns (e.g., sequential read/write patterns, frequency of accesses, data objects relationships, etc.), data organization, amount or volume of data, spill tier characteristics and latency, SLA requirements, type of operator, etc.

When spilled data is read back from the spill data store 106, 120, the I/O manager 206 performs a read operation to fetch a block 220*b* that includes requested spilled data. When spilled data is read back from a spill data store 106, 120, the example I/O manager 206 can first attempt to read the requested spilled data from a faster tier (e.g., the low-latency tier spill data store 120) before attempting a read of the requested spilled data from a secondary tier (e.g., remote tier spill data store 106) if the requested spilled data is not located in the faster tier.

In example FIG. 2, the I/O manager 206 writes the requested block 220*b* to local memory 116 without writing the block 220*b* to the local file staging data store 118. The example spill manager 204 reads a page 218*b* (or multiple pages) of requested spilled data and writes the page 218*b* (or multiple pages) to a buffer pool 216*b* in the local memory 116. As shown in example FIG. 2, the spill manager 204 pins the page 218*b* (or multiple pages) in the buffer pool 216*b*. In this manner, the requested spilled data in the block 220*b* can be accessed as soon as possible from the local memory 116. In either case, a block of requested spilled data resides in the local memory 116 when read back from the spill data store 106, 120 which results in relatively faster data access of the requested spilled data than if the block 220*b* remains in the local file staging data store 118 before each read of spilled data from the block 220*b*.

By storing multiple pages of spilled data in a single block, examples disclosed herein may be used to perform batch reads (or block reads) of multiple pages from the spill data store 106, 120. Examples disclosed herein read multiple blocks in sequential order, thereby prefetching spilled data that is likely to be subsequently requested by a requestor (e.g., a client, a consumer, etc.). Performing batch reads or block reads in accordance with examples disclosed herein accelerates the network transfer per base unit (e.g., a per-block read operation to read a block having multiple pages of spilled data).

In example FIG. 2, after a block of spilled data fetched from the spill data store 106, 120 and residing in the local memory 116 has been fully read, the spill manager 204 evicts the block in its entirety to recycle the corresponding memory space in the local memory 116. In this manner, examples disclosed herein preserve memory resources for efficient utilization by subsequent spilled data fetched from the spill data store 106, 120. Writing spilled data into specific blocks facilitates reading an entire block at a time, which results in efficient use of memory and network resources.

Figure 3:
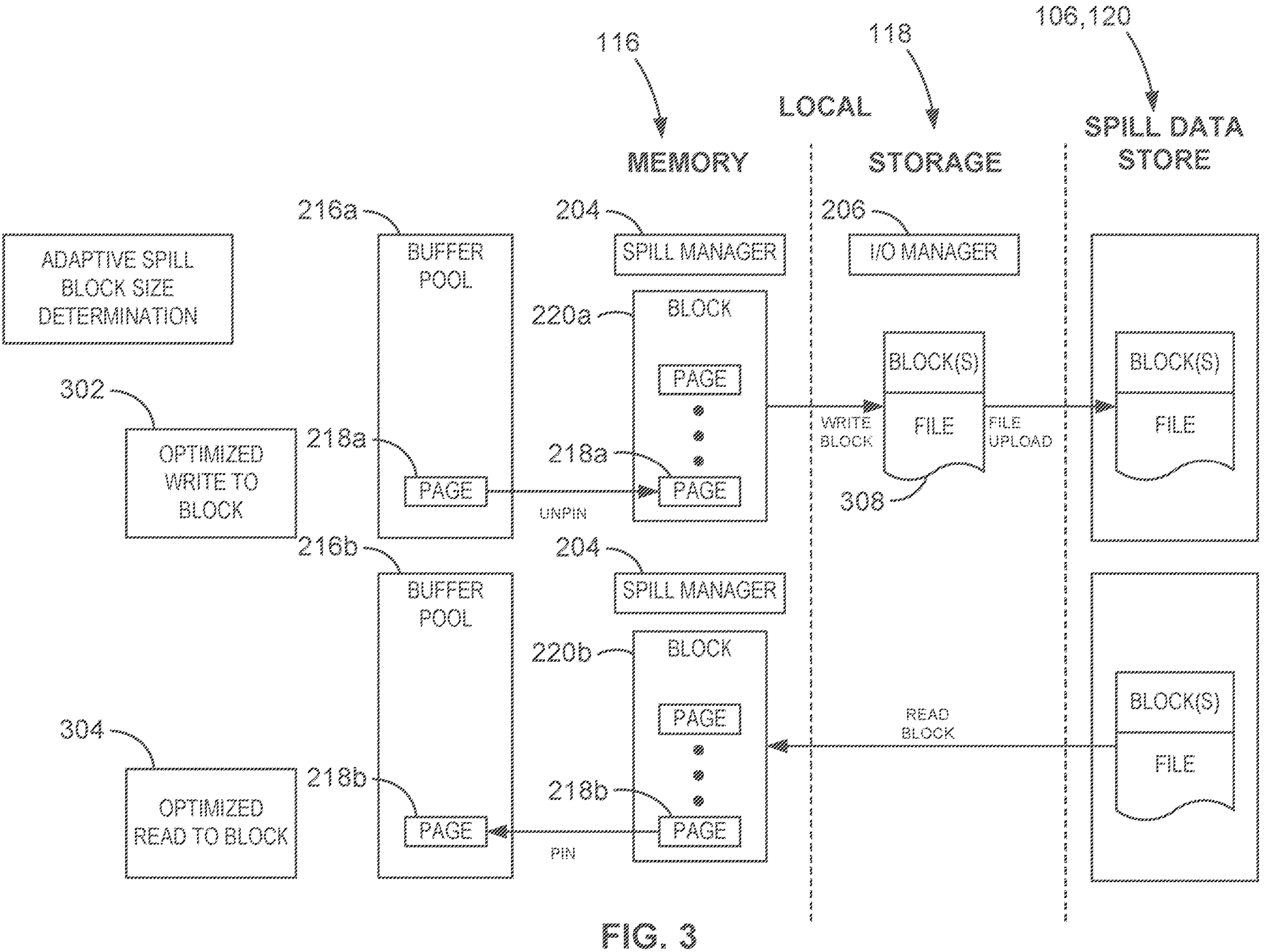
FIG. 3 is an example data spilling flow diagram to implement writes to and batch reads from a spill data store for spilled data in the environment of FIG. 1.

FIG. 3 is an example data spilling flow diagram to implement writes to and batch reads from remote storage for spilled data in the environment 100 of FIG. 1. As used herein, spilling refers to paging out data from primary local memory (e.g., a low-latency, high performance local memory) to one or more secondary tiers (e.g., the spill data store 106, 120). Secondary tiers could be secondary local memory, remote network-connected memory, and/or any other suitable local and/or remote storage resources. In examples disclosed herein, spilling to secondary tiers is asynchronous and results in no degradation or substantially unnoticeable degradation to application performance.

Example FIG. 3 includes a “write to block” process 302 and a “read to block” process 304. In the example “write to block” process 302, pages (e.g., the page 218*a*) from a process thread are written into a series of blocks (e.g., including the block 220*a*) based on a sequence relevant to the data in the pages (e.g., monthly sales organized by day, employee salaries organized by job title, network traffic data organized by geographic regions, etc.). For example, the “write to block” process 302 writes pages from a same partition into sequential blocks to facilitate batch reading of the pages. That is, writing pages from the same partition into sequential blocks increases the likelihood that the sequence of related blocks will be consecutively read back together (e.g., from the spill data store 106, 120) during a read-back process. In addition, the “write to block” process 302 and/or the spill manager 204 assigns a same block identifier to the blocks to identify the blocks as belonging to the same partition. Similarly, different block identifiers can be assigned to other blocks to identify those blocks as associated with different corresponding partitions.

The example spill manager 204 organizes the blocks in a file 308 in the local file staging data store 118 (e.g., a local tier). In some examples, the spill manager 204 writes the blocks asynchronously to the local file staging data store 118. When the file 308 is full and the local file staging data store 118 is near capacity, the example I/O manager 206 uploads the file 308 to the spill data store 106, 120. In some examples, the I/O manager 206 uploads the files to the spill data store 106, 120 (e.g., a secondary tier) asynchronously when the local file staging data store 118 is near capacity. Also in some examples, the I/O manager 206 uses an eviction policy (e.g., a least recently used (LRU) eviction policy) to manage the uploading of the files. Additionally, the example spill manager 204 and/or the example I/O manager 206 uses one or more SLA requirements for making spilling decisions. If the file 308 has data from frequently accessed applications or applications with strict SLA requirements, the example I/O manager 206 writes/uploads the file 308 to a low-latency tier spill data store 120 or any other low-latency storage volume. The example spill manager 204 and/or the example I/O manager 206 prioritizes uploading files with data corresponding to an application having relatively more relaxed SLA requirements and/or less frequently accessed data, over a file which has data corresponding to an application having stricter SLA requirements and/or frequently accessed data. In this manner, the example spill manager 204 and/or the example I/O manager 206 maintains more frequently accessed data in faster-access memory or storage so that it can be accessed faster for the application having the stricter SLA requirements.

In the example “read to block” process 304, the I/O manager 206 fetches the block 220*b* from the spill data store 106, 120, writes the block 220*b* directly to the local memory 116, and pins one or more page(s) 218*b* to the buffer pool 216 in response to a request to read a page of the block 220*b*. The example spill manager 204 stores the block 220*b* in the local memory 116 until all the pages (e.g., including page 218*b*) of the block 220*b* are read. After all the pages of the block 220*b* are read, the example spill manager 204 evicts the block 220*b* from the local memory 116 so that memory space used by the block 220*b* is recycled. During the “read to block” process 304, the I/O manager 206 uses temporal locality and/or spatial locality to read back multiple blocks from the spill data store 106, 120. In examples disclosed herein, temporal locality refers to the likelihood that a block will be requested at a particular time. For example, if historical read requests show two blocks are often requested consecutively or within a short duration of one another, a read request of a first one of the blocks can serve as a hint to the I/O manager 206 that the second one of the blocks should be prefetched from the spill data store 106, 120 because there is a high likelihood that the second block will be subsequently requested after the first block. In examples disclosed herein, spatial locality refers to blocks of related information (e.g., blocks belonging to the same partition) being stored adjacent one another in sequential order in the spill data store 106, 120. In this manner, spatial locality can be leveraged by the I/O manager 206 to read back sequential, related blocks from the spill data store 106, 120 when a first one of the blocks is requested.

Since multiple blocks are stored in the spill data store 106, 120 in a sequential order (e.g., spatial locality) that is relevant to the spilled data across the multiple blocks, it is highly likely that subsequent data read requests will be received (e.g., temporal locality) to read subsequent blocks including spilled data related to the spilled data in the block 220*b*. To improve data access times and increase efficiencies of network resource usage, the example I/O manager 206 leverages such likelihood of future reads to prefetch sequential blocks from the spill data store 106, 120 at the same time that the block 220*b* is fetched from the spill data store 106, 120. In this manner, when the read requests are received, the I/O manager 206 will have already fetched the requested blocks and the requested blocks will be immediately ready to be read from the local memory 116. Example prefetching operations are shown in FIG. 4.

Figure 4:
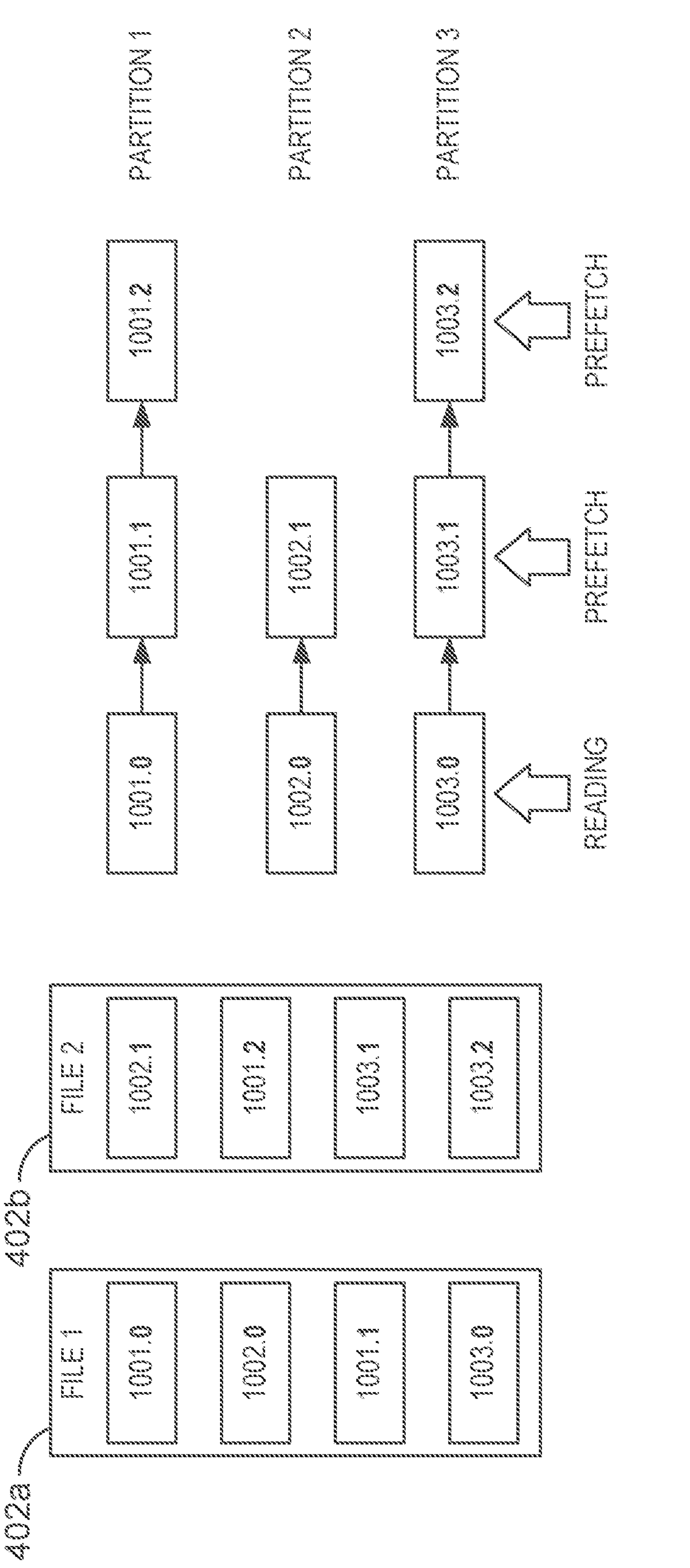
FIG. 4 is an example of prefetching for sequentially stored spilled data from a spill data store in the environment of FIG. 1.

FIG. 4 is an example of prefetching for sequentially stored spilled data from a spill data store in the environment 100 of FIG. 1. Example FIG. 4 includes files 402*a*, 402*b* that include blocks corresponding to different partitions. The partitions in example FIG. 4 are shown as partition 1, partition 2, and partition 3. Partition 1 is represented by a partition identifier of 1001, partition 2 is represented by a partition identifier 1002, and partition 3 is represented by a partition identifier 1003. Each partition also includes multiple blocks represented by corresponding block identifiers (IDs) of "0", "1", "2", etc. As such, a partition block (e.g., a block) is represented by a partition identifier and a block identifier (e.g., 1001.0, 1002.1, 1003.2, etc.). In example FIG. 4, partitions of related data are organized in sequential blocks identified by the same partition number and corresponding block IDs (e.g., 1001.0, 1001.1, 1001, 2). That is, the spilled data is stored in blocks in a sequential order relevant to the spilled data contained in those blocks. For example, the partition 1001 includes blocks 1001.0, 1001.1, 1001.2 because the arrangement or sequence used to organize the blocks "0", "1", and "2" in partition 1001 is based on access pattern characteristics of how the data in those blocks was accessed when the data was analyzed (e.g., accessed by the SQL operator 214 of FIG. 2). For example, the data organization in the partition 1001 means that during a data process or data analysis, access of data in block 1001.0 was followed by access of data in block 1001.1 which was followed by access of data in block 1001.2.

Although the files 402*a*, 402*b* are shown as including non-sequential blocks, this does not interfere with sequential prefetching of related blocks during a read from a spill data store 106, 120. That is, the I/O manager 206 can perform a sequential read of related blocks by performing block reads from different files (e.g., the files 402*a*, 402*b*) in the spill data store 106, 120. In some examples, separating sequentially related blocks across different files (e.g., the files 402*a*, 402*b*) can be advantageously used to perform parallel accesses of the different files in different storage volumes. For example, the file 402*a* stores block 1003.0, and the file 402*b* stores blocks 1003.1 and 1003.2 which are related to block 1003.0. During a read of block 1003.0 from the file 402*a* in one storage volume, a prefetch read of block 1003.1 can be performed concurrently from the file 402*b* in another storage volume followed by a prefetch read of block 1003.2 from the file 402*b*. This can decrease the amount of time needed to read the first block and prefetch the subsequent two blocks. Alternatively, all of the related blocks 1003.0, 1003.1, 1003.2 can be stored in the same storage volume and sequentially read in seriatim from that storage volume. In any case, the sequential prefetching of subsequent related blocks improves usage efficiency of network resources and improves computational performance by having related data ready for access when subsequently requested by a data requestor (e.g., a client, a consumer, etc.).

Figure 5:
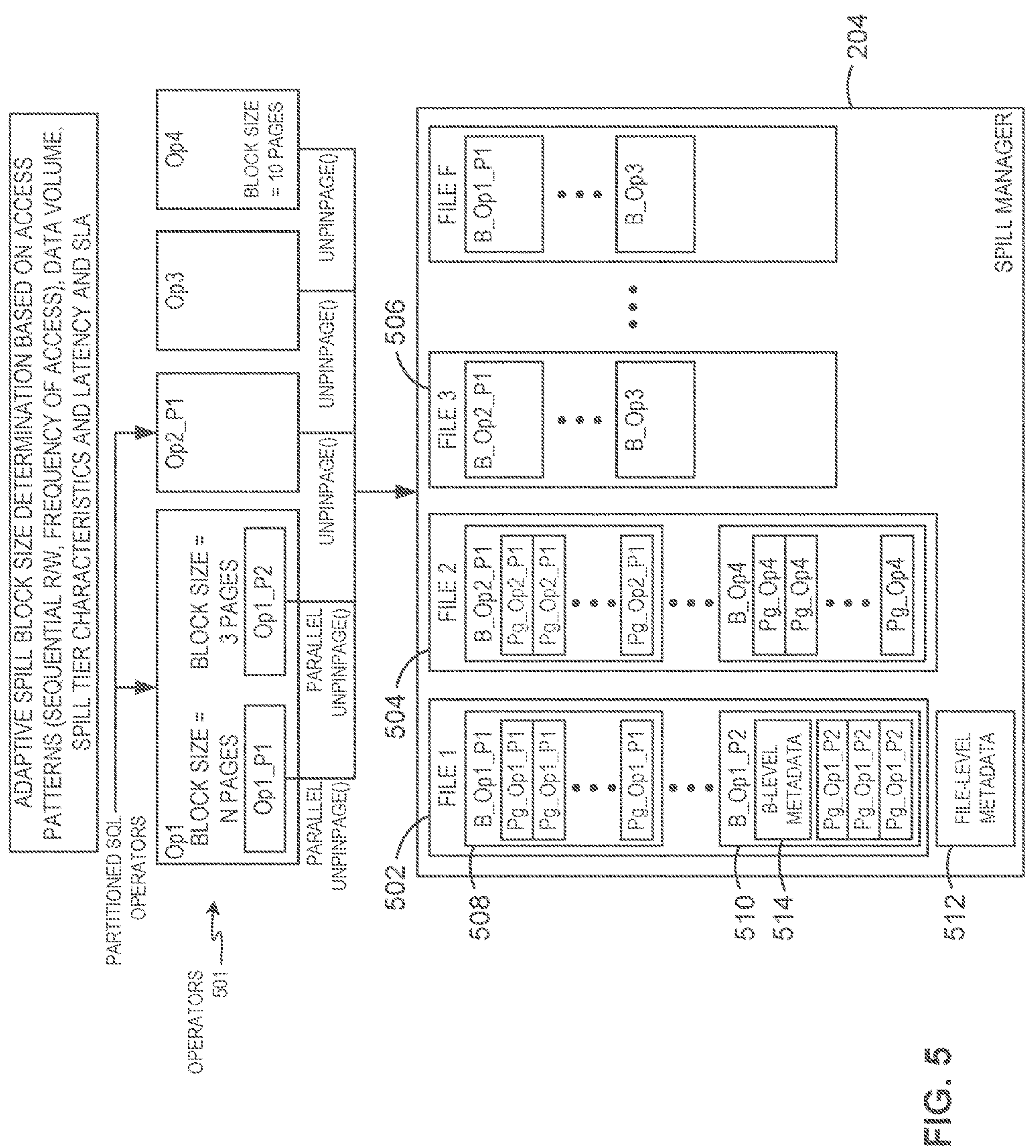
FIG. 5 is an example block-based file structure to implement writes and batch reads of spilled data from one or more spill data stores in the environment of FIG. 1.

FIG. 5 is an example block-based file structure to implement writes and/or batch reads of spilled data from one or more spill data stores 106, 120 (FIG. 1) in the environment 100 of FIG. 1. The example spill manager 204 can perform adaptive spill block size determination based on access patterns (e.g., sequential read/write patterns, frequency of accesses, data objects relationships, etc.), an amount or volume of data, spill tier characteristics and latency, service level agreement (SLA) requirements, type of operator, etc. Example FIG. 5 includes operators 501 shown as SQL operators Op1, Op2, Op3, Op4. Example SQL operator Op1 and example SQL operator Op2 are partitioned SQL operators in that the intermediate data produced by those SQL operators is written in pages organized in blocks and the blocks are grouped by partition. Example SQL operator Op3 and example SQL operator Op4 are non-partitioned SQL operators meaning that intermediate data produced by those SQL operators is written in pages organized in blocks but the blocks are not grouped by partition because there is just a single partition. In examples disclosed herein, non-partitioned operators are a special case of partitioned operators with a single partition. A SQL operator may decide to partition its data based on several factors including, resource availability (e.g., memory resource availability, storage resource availability, CPU resource availability, GPU resource availability, etc.), performance requirements (e.g., using multiple threads to work on independent partitions could potentially result in faster processing), amount of or volume of data being processed (e.g., larger data should generally be partitioned so that individual partitions can fit in working memory), and/or semantic requirements (e.g., certain operations like ranking of data requires the entire data to be treated as a single partition). The partitioning of the partitioned SQL operators Op1, Op2 enables grouping related spilled data sequentially into corresponding partitions so that subsequent reads of that related spilled data can be performed in connection with prefetches of related spilled data, as described above in connection with FIG. 4. Similarly, the blocks of non-partitioned SQL operators Op3 and Op4 can also be prefetched to exploit sequential read access patterns.

In example FIG. 5, label "OpQ" stands for SQL operatorQ, label "OpQ_PM" stands for partition M of SQL operator Q, label "B_OpQ_PM" stands for block from partition M of SQL operator Q, label "B_OpQ" stands for block from unpartitioned SQL operator Q, label "Pg_OpQ_PM" stands for page (Pg) from partition M of SQL operator Q, and label "Pg_OpQ" stands for page (Pg) from unpartitioned SQL operator Q.

Example FIG. 5 includes a first partition of the first SQL operator Op1 represented as "Op1_P1" and includes a second partition of the first SQL operator Op1 represented as "Op1_P2". The block size of the example first partition of the first SQL operator Op1 ("Op1_P1") is adaptive (e.g., block size=N pages, wherein N can be dynamically determined on a per-operator basis to be any integer value). In the illustrated example, the block size of the example second partition of the first SQL operator Op1 ("Op1_P2") is determined by the first SQL operator Op1 to be N=3 (e.g., block size=3 pages). That is, the second partition ("Op1_P2") is an example in which the block size 'N' is set equal to 3 by an operator. To change the adaptive block size of the first partition "Op1_P1", the example spill manager 204 analyzes one or more criteria of the spilled data (e.g., access patterns, amount or volume of data, spill tier characteristics and latency, SLA requirements, type of operator, etc.) and uses such analysis to determine a number of pages to store in a block. The example spill manager 204 can perform such analyses and set block sizes on a per-operator basis such that consecutive blocks in the same partition can have a different size based on the spilled data stored therein relative to sizes of blocks in another partition.

As shown in example FIG. 5, since the first SQL operator Op1 generates spilled data into two partitions, the example spill manager 204 can perform parallel unpinpage( ) operations to write pages of spilled data corresponding to the first SQL operator Op1 from the local memory 116 to corresponding files in the local file staging data store 118. In some examples, parallel unpinpage( ) can be employed so that different operators can spill/load in parallel to/from the spill data store 106, 120. That is, parallel unpinpage( ) can be used to perform spill/load operations in parallel across multiple operators. The example spill manager 204 also performs separate unpinpage( ) operations to write pages of spilled data from the second SQL operator Op2, the third SQL operator Op3, and the fourth SQL operator Op4. The example spill manager 204 manages F number of files that include a first file 502, a second file 504, and a third file 506. The example first file 502 includes a block 508 ("B_Op1_P1") corresponding to the first partition of the first SQL operator ("Op1_P1") and another block 510 corresponding to the second partition of the first SQL operator ("Op1_P2"). In examples disclosed herein, it is not necessary for each file to contain blocks from the same operator. For example, the file 504 contains blocks from SQL operator ("Op2_P1") and SQL operator Op4. In the example block 508, a number of pages of spilled data ("Pg_Op1_P1") to be stored therein is equal to a number of pages N (e.g., block size=N pages) selected by a corresponding operator based on the adaptive block sizing described above. For example, the number of pages of spilled data to be stored in the block 510 is set at N=3 by a corresponding operator. In other examples, any other block size N may be used that is fewer or more than three pages per block.

In example FIG. 5, the example spill manager 204 includes an example file-level metadata table 512 and each block (e.g., blocks 508, 510) includes a block-level metadata table, one of which is shown as block-level (b-level) metadata table 514 in connection with the block 510. The example file-level metadata table 512 stores high-level metadata such as how many blocks per file and block identifiers (IDs). The example spill manager 204 uses the file-level metadata table 512 to track storage locations of files and blocks of spilled data in spill data stores 106, 120. The block-level metadata table 514 includes metadata describing how many pages are in a block and/or how many pages are in a block group. By using the block-level metadata table 514, a block is self-contained (e.g., self-described) independent of other blocks. Examples disclosed herein use such self-contained characteristics of blocks to adaptively or dynamically change block sizes (e.g., amount of data per block, pages per block, etc.) on a per-operator basis over time to adapt to different access patterns, amounts or volumes of data, SLA requirements, spill tier characteristics and latencies, etc.

While an example manner of implementing the example fragment coordinator 202, the example spill manager 204, and the example I/O manager 206 is illustrated in FIG. 2, one or more of the elements, processes, and/or devices illustrated in FIG. 2 may be combined, divided, re-arranged, omitted, eliminated, and/or implemented in any other way. Further, the example fragment coordinator 202, the example spill manager 204, the example I/O manager 206, and/or, more generally, the adaptive and/or SLA-aware paging system 200 of FIG. 2, may be implemented by hardware alone or by hardware in combination with software and/or firmware. Thus, for example, any of the example fragment coordinator 202, the example spill manager 204, the example I/O manager 206, and/or, more generally, the adaptive and/or SLA-aware paging system 200 could be implemented by programmable circuitry in combination with machine-readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example fragment coordinator 202, the example spill manager 204, the example I/O manager 206, and/or, more generally, the adaptive and/or SLA-aware paging system 200 of FIG. 2 may include one or more elements, processes, and/or devices in addition to, or instead of, those illustrated in FIG. 2, and/or may include more than one of any or all of the illustrated elements, processes and devices.

As described above, the example fragment coordinator 202, the example spill manager 204, and/or the example I/O manager 206 of FIG. 2 are structures. Such structures may implement means for performing corresponding disclosed functions. Examples of such functions are described above in connection with corresponding ones of the example fragment coordinator 202, the example spill manager 204, and/or the example I/O manager 206 and are described below in connection with the flowcharts of FIGS. 6A and 6B.

Figure 6A:
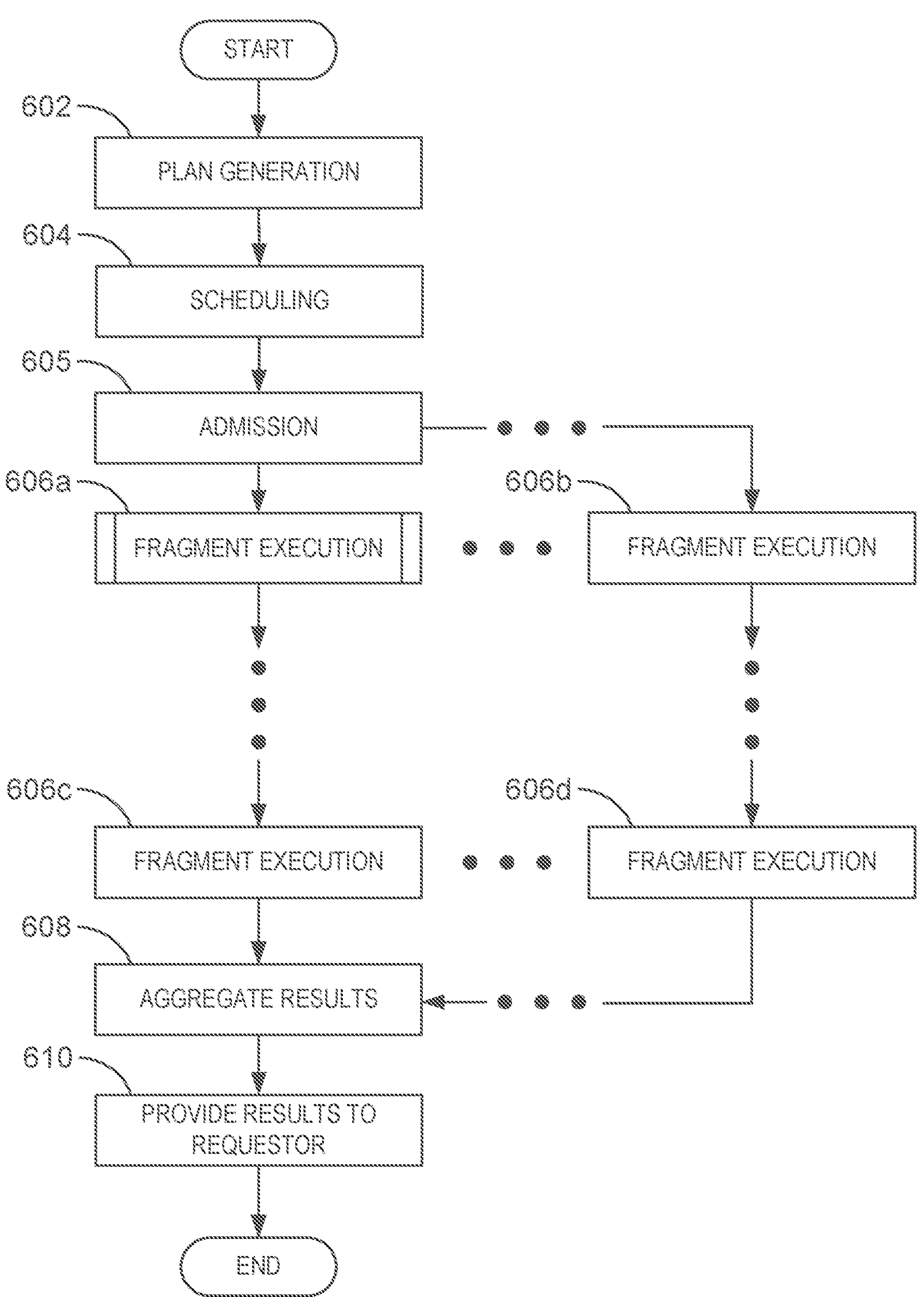
FIGS. 6A and 6B are flowcharts representative of example machine-readable instructions and/or example operations that may be executed, instantiated, and/or performed by example programmable circuitry to implement the fragment coordinator, the spill manager, and/or the input-output (I/O) manager of FIG. 2 to implement the adaptive and/or SLA-aware paging system of FIG. 2 in accordance with teachings of this disclosure.
Figure 6B:
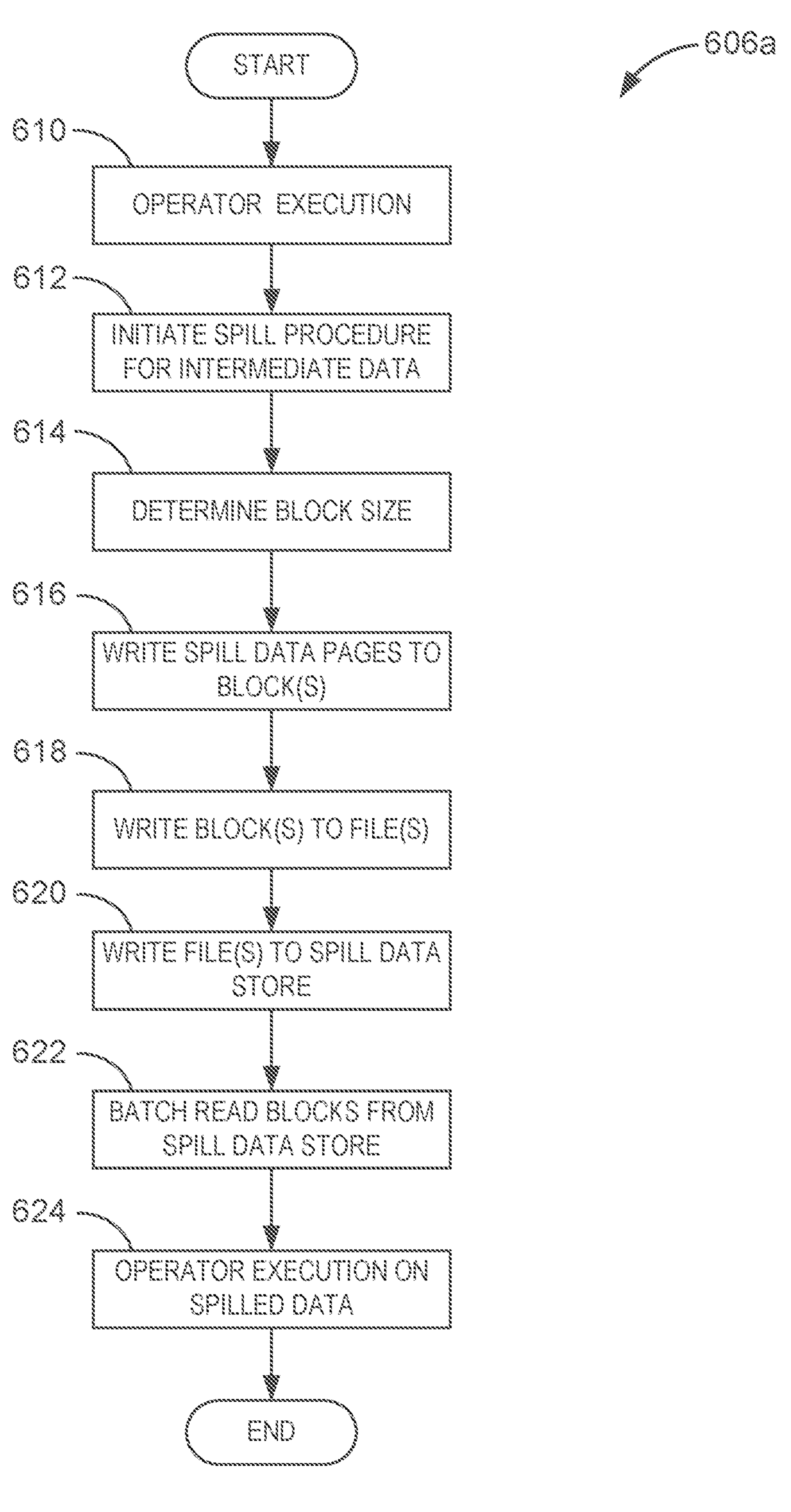

Flowcharts representative of example machine-readable instructions, which may be executed by programmable circuitry to implement and/or instantiate the example fragment coordinator 202, the example spill manager 204, the example I/O manager 206, and/or, more generally, the adaptive and/or SLA-aware paging system 200 of FIG. 2 and/or representative of example operations which may be performed by programmable circuitry to implement and/or instantiate the example fragment coordinator 202, the example spill manager 204, the example I/O manager 206, and/or, more generally, the adaptive and/or SLA-aware paging system 200 of FIG. 2 are shown in FIGS. 6A and 6B. The machine-readable instructions may be one or more executable programs or portion(s) of one or more executable programs for execution by programmable circuitry such as the programmable circuitry 712 shown in the example programmable circuitry platform 700 discussed below in connection with FIG. 7 and/or may be one or more function(s) or portion(s) of functions to be performed by the example programmable circuitry (e.g., an FPGA) discussed below in connection with FIGS. 8 and/or 9. In some examples, the machine-readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer-readable and/or machine-readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer-readable and/or machine-readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer-readable storage medium may include one or more mediums. Further, although the example program is described with reference to the flowchart(s) illustrated in FIGS. 6A, 6B, many other methods of implementing the example fragment coordinator 202, the example spill manager 204, and/or the example I/O manager 206 may alternatively be used. For example, the order of execution of the blocks of the flowchart(s) may be changed, and/or some of the blocks described may be changed, eliminated, or combined. Additionally or alternatively, any or all of the blocks of the flowchart(s) may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine-readable instructions described herein may be stored in one or more of a compressed format, an encrypted format, a fragmented format, a compiled format, an executable format, a packaged format, etc. Machine-readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine-executable instructions. For example, the machine-readable instructions may be fragmented and stored on one or more storage devices, disks and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of computer-executable and/or machine-executable instructions that implement one or more functions and/or operations that may together form a program such as that described herein.

In another example, the machine-readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable, computer-readable and/or machine-readable media, as used herein, may include instructions and/or program(s) regardless of the particular format or state of the machine-readable instructions and/or program(s).

The machine-readable instructions described herein can be represented by any past, present, or future instruction language, scripting language, programming language, etc. For example, the machine-readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 6A, 6B may be implemented using executable instructions (e.g., computer-readable and/or machine-readable instructions) stored on one or more non-transitory computer-readable and/or machine-readable media. As used herein, the terms non-transitory computer-readable medium, non-transitory computer-readable storage medium, non-transitory machine-readable medium, and/or non-transitory machine-readable storage medium are expressly defined to include any type of computer-readable storage device and/or storage disk and to exclude propagating signals and to exclude transmission media. Examples of such non-transitory computer-readable medium, non-transitory computer-readable storage medium, non-transitory machine-readable medium, and/or non-transitory machine-readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer-readable storage device" and "non-transitory machine-readable storage device" are defined to include any physical (mechanical, magnetic and/or electrical) hardware to retain information for a time period, but to exclude propagating signals and to exclude transmission media. Examples of non-transitory computer-readable storage devices and/or non-transitory machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer-readable instructions, machine-readable instructions, etc., and/or manufactured to execute computer-readable instructions, machine-readable instructions, etc.

FIGS. 6A and 6B are flowcharts representative of example machine-readable instructions and/or example operations that may be executed, instantiated, and/or performed by example programmable circuitry to implement the fragment coordinator 202, the spill manager 204, and/or the input-output (IO) manager 206 of FIG. 2 to implement the adaptive and/or SLA-aware paging system 200 of FIG. 2 in accordance with teachings of this disclosure. The example instructions of FIG. 6A begin at block 602 at which the fragment coordinator 202 generates a query plan to service a query using fragment execution. For example, the query 224 may be submitted by a client to access particular data. To service the query 224, the fragment coordinator 202 prepares for the fragment execution 208 (FIG. 2) by parsing the query 224 (FIG. 2) into multiple fragment tasks that can be executed in respective fragment instance executions 210*a*, 210*b* (FIG. 2) during the fragment execution 208. In this manner, each fragment task retrieves a corresponding portion of data from the raw data store 104 (FIG. 1). In some examples, requested raw data can be stored in separate raw data stores, and the fragment tasks can be advantageously executed in parallel to retrieve the requested data faster from multiple raw data store locations. In some examples, to optimize the plan generated at block 602, the fragment coordinator 202 assigns ones of the fragment tasks to specific resources that are more suitable for executing operators of those fragment tasks. For example, the fragment coordinator 202 may assign a fragment task that involves searching large amounts of data to a computer having a large local storage resource and may assign a separate fragment task that involves encoding data to a computer having a media encoder hardware accelerator.

At block 604, the example fragment coordinator 202 performs scheduling of the fragment tasks. For example, the fragment coordinator 202 schedules the fragment tasks to be performed by different process threads in one or more resources. In some examples, such process threads are executed on different computers (e.g., multiple computers in a cluster) to leverage parallelism by scheduling the different computers to execute at least some of the fragment tasks in parallel. Additionally or alternatively, some or all of the process threads may be executed on a single processor (e.g., a single threading processor or a multithreading processor) or on multiple processors in a single computer. The example fragment coordinator 202 performs admission of the execution of the fragment tasks (block 605). For example, the fragment coordinator 202 admits the fragment tasks for execution by corresponding process threads (e.g., the fragment instance executions 210*a*, 210*b* of FIG. 2) of one or more scheduled resources.

Example fragment instance executions performed by the process threads are shown in example FIG. 6A at blocks 606*a*-606*d*. Example instructions that may be used to implement the fragment instance execution of block 606*a* are described below in connection with the flowchart of FIG. 6B. Substantially similar instructions may be used to implement the fragment instance execution of any of blocks 606*b*-606*d*. The multiple fragment executions of blocks 606*a*-606*d* may scan and/or operate on different parts of data to complete a query plan generated by the fragment coordinator 202.

At block 608, the example fragment coordinator 202 aggregates intermediate data and forms final query results. For example, the fragment coordinator 202 aggregates the intermediate data generated by fragment tasks at blocks 606*a*-606*d*. In this manner, the fragment coordinator 202 forms a final intermediate data set that is responsive to the query 224 received by the fragment coordinator 202 in FIG. 2. The fragment coordinator 202 may then provide the final query results to a requestor (block 610). For example, the fragment coordinator 202 may provide the final intermediate data set to the requestor (e.g., a client, a consumer, etc.) by causing transmission of the final intermediate data set to the requestor and/or by storing the final intermedia data set at a storage location accessible by the requestor and/or by using any other suitable manner for conveying the final query results. The example instructions of FIG. 6A end.

FIG. 6B is a flowchart representative of example machine-readable instructions and/or example operations that may be executed, instantiated, and/or performed by example programmable circuitry to implement the fragment instance execution of block 606*a* of FIG. 6B. The example instructions of FIG. 6B begin at block 610 at which one or more processors apply one or more SQL operators of a fragment task. For example, the CPU 112 (FIG. 1) applies the SQL operator 214 (FIG. 2) to raw data to generate intermediate data. At block 612, when a SQL operator's memory usage approaches its maximum capacity, the example spill manager 204 (FIG. 2) initiates a spill procedure to spill the generated intermediate data and/or raw data. The spill procedure may be initiated based on a spill instruction in the SQL operator 214. For example, an amount of memory allocated in the local memory 116 (FIGS. 1 and 2) to the SQL operator 214 may be filled by the intermediate data generated by the SQL operator 214 at block 610. However, the spill instruction in the SQL operator 214 can initiate the spill procedure to free up space in the local memory 116. In addition, as discussed above, a SQL operator can organize the intermediate data and/or raw data in multiple partitions or a single partition. At block 614, the example spill manager 204 determines a block size for a partition. The block size may be fixed or adaptive, as described above in connection with FIG. 5. For example, the block size may be based on characteristics (e.g., data access patterns, data organization, amount or volume of raw data, spill tier characteristics and latency, SLA requirements, type of operator, etc.) of the corresponding SQL operator.

At block 616, the example spill manager 204 causes spilled data pages to be written from the local memory 116 (FIGS. 1 and 2) to one or more blocks. For example, the spill manager 204 sends a write request to the local memory 116 to write the data pages in the one or more blocks in the local memory 116. In the illustrated example, the spill manager 204 causes the pages to be written to blocks in a sequential order based on relevancy of the data across pages and/or across blocks. In this manner, sequential readbacks of blocks results in prefetches of additional blocks (e.g., blocks not yet requested) that are relevant or related to data in requested blocks. That is, the likelihood of an operator subsequently requesting a prefetched block is high based on a current block that was requested by that operator.

At block 618, the example spill manager 204 causes the one or more blocks to be written to one or more files in the local file staging data store 118 (FIGS. 1-3). For example, the spill manager 204 sends a write request to the local file staging data store 118 to write the one or more blocks in the one or more files. In this manner, the one or more blocks are staged with other blocks in the one or more files so that blocks can be uploaded in a file format to a spill data store 106, 120.

At block 620, when one or more file(s) in the local file staging data store 118 is/are full, the example I/O manager 206 causes writing of the file(s) to a spill data store 106, 120. For example, the spill manager 204 can determine which tier of a plurality of spill data store tiers (e.g., the low-latency tier spill data store 120*a*, the lower-latency, higher cost tier spill data store 120*b*, the remote tier spill data store 106, etc.) should be used to store the file(s) and communicate the indication(s) of the selected tier(s) to the I/O manager 206. The example I/O manager 206 can then direct one or more file(s) for writing at the selected tier(s) of the spill data store 106, 120. For example, the I/O manager 206 can send a write request to the spill data store 106, 120 to write the file(s) in the selected tier(s).

At block 622, the example I/O manager 206 batch reads sequential blocks from the spill data store in accordance with examples disclosed herein. That is, the example I/O manager 206 batch reads sequential blocks from the spill data store 106, 120 in response to an operator (e.g., the SQL operator 214 of FIG. 2) being ready to process the raw data in those blocks to generate intermediate data. For example, as described above, the I/O manager 206 can access the spill data store 106, 120 to read a block that includes one or more pages of requested spilled data and prefetch one or more subsequent blocks that are in the same block ID sequence as the requested block. As discussed above, the example I/O manager 206 and the example spill manager 204 work together to read the blocks into the local memory 116 for access by an operator (e.g., the SQL operator 214) and, after all pages of a block have been read by the operator, the spill manager 204 evicts the block from the local memory 116 to recycle the corresponding memory space.

At block 624, one or more processors apply one or more SQL operators on the spilled data. For example, the CPU 112 (FIG. 1) applies the SQL operator 214 on the spilled data (e.g., intermediate data generated by a previous operator operation and/or raw data) to generate additional intermediate data as a result of the operator execution. In some examples, additional CPUs of the local host 102 and/or additional CPUs of other machines may execute respective operators on the spilled data. In some examples, one operator may pass its result to another operator. The example instructions of FIG. 6B end, and control returns to the example instructions and/or operations of FIG. 6A.

Figure 7:
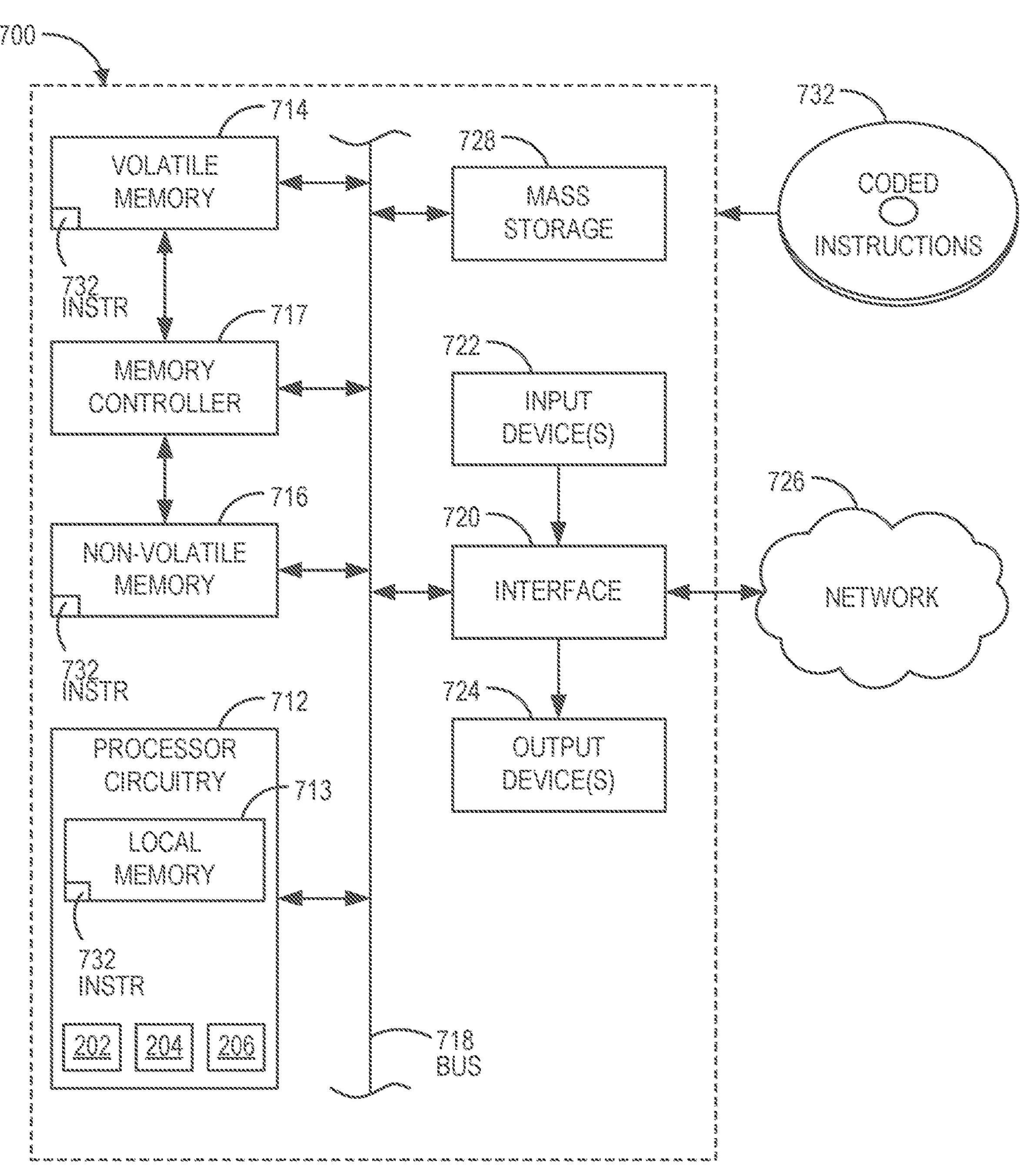
FIG. 7 is a block diagram of an example processing platform including programmable circuitry structured to execute, instantiate, and/or perform the example machine-readable instructions and/or perform the example operations of FIG. 6 to implement the fragment coordinator, the spill manager, and the input-output (IO) manager of FIG. 2.

FIG. 7 is a block diagram of an example programmable circuitry platform 700 structured to execute and/or instantiate the example machine-readable instructions and/or the example operations of FIGS. 6A, 6B to implement the example fragment coordinator 202, the example spill manager 204, the example I/O manager 206, and/or, more generally, the adaptive and/or SLA-aware paging system 200 of FIG. 2. The programmable circuitry platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing and/or electronic device. In examples, disclosed herein, the programmable circuitry platform 700 may be used to implement the local host 102 of FIG. 1.

The programmable circuitry platform 700 of the illustrated example includes programmable circuitry 712. The programmable circuitry 712 of the illustrated example is hardware. For example, the programmable circuitry 712 can be implemented by one or more integrated circuits, logic circuits, FPGAs, microprocessors, CPUs, GPUs, DSPs, and/or microcontrollers from any desired family or manufacturer. The programmable circuitry 712 may be implemented by one or more semiconductor based (e.g., silicon based) devices. The example programmable circuitry 712 may implement the CPU 112 of FIG. 1. In this example, the programmable circuitry 712 implements the example fragment coordinator 202, the example spill manager 204, and the example I/O manager 206 of FIG. 2.

The programmable circuitry 712 of the illustrated example includes a local memory 713 (e.g., a cache, registers, etc.). The programmable circuitry 712 of the illustrated example is in communication with main memory 714, 716, which includes a volatile memory 714 and a non-volatile memory 716, by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717. In some examples, the memory controller 717 may be implemented by one or more integrated circuits, logic circuits, microcontrollers from any desired family or manufacturer, or any other type of circuitry to manage the flow of data going to and from the main memory 714, 716. The example memory controller 717 may implement the memory controller 114 of FIG. 1 and the volatile memory 714 may implement the local memory 116 of FIG. 1.

The programmable circuitry platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user (e.g., a human user, a machine user, etc.) to enter data and/or commands into the programmable circuitry 712. The input device(s) 722 can be implemented by, for example, an audio sensor, a microphone, a camera (still or video), a keyboard, a button, a mouse, a touchscreen, a trackpad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc. The example interface circuitry 720 may implement the communication interface 122 of FIG. 1.

The programmable circuitry platform 700 of the illustrated example also includes one or more mass storage discs or devices 728 to store firmware, software, and/or data. Examples of such mass storage discs or devices 728 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs. The example mass storage 728 may include multiple mass storage devices having different performance characteristics. Such multiple mass storage devices may implement the local file staging data store 118, the low-latency tier spill data store 120*a*, and/or the lower-latency, higher cost tier spill data store 120*b* of FIG. 1.

The machine-readable instructions 732, which may be implemented by the machine-readable instructions of FIGS. 6A, 6B, may be stored in the mass storage device 728, in the volatile memory 714, in the non-volatile memory 716, and/or on at least one non-transitory computer-readable storage medium such as a CD or DVD which may be removable.

Figure 8:
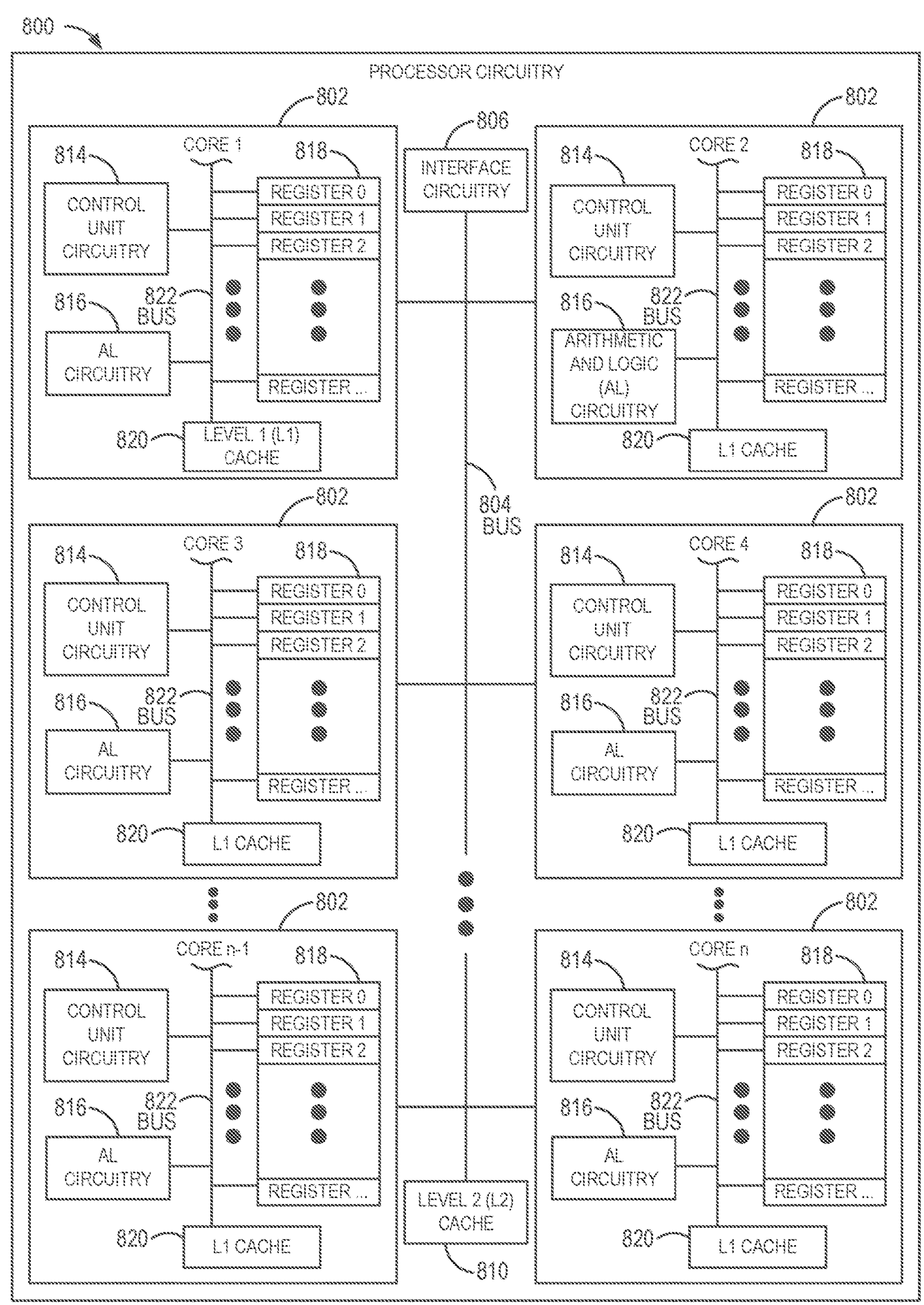
FIG. 8 is a block diagram of an example implementation of the programmable circuitry of FIG. 7.

FIG. 8 is a block diagram of an example implementation of the programmable circuitry 712 of FIG. 7. In this example, the programmable circuitry 712 of FIG. 7 is implemented by a microprocessor 800. For example, the microprocessor 800 may be a general-purpose microprocessor (e.g., general-purpose microprocessor circuitry). The microprocessor 800 executes some or all of the machine-readable instructions of the flowcharts of FIGS. 6A, 6B to effectively instantiate the circuitry of FIG. 2 as logic circuits to perform operations corresponding to those machine-readable instructions. In some such examples, the circuitry of FIG. 2 is instantiated by the hardware circuits of the microprocessor 800 in combination with the machine-readable instructions. For example, the microprocessor 800 may be implemented by multi-core hardware circuitry such as a CPU, a DSP, a GPU, an XPU, etc.

Although it may include any number of example cores 802 (e.g., 1 core), the microprocessor 800 of this example is a multi-core semiconductor device including 'n' cores. The cores 802 of the microprocessor 800 may operate independently or may cooperate to execute machine-readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine-readable instructions and/or operations represented by the flowcharts of FIGS. 6A, 6B.

The cores 802 may communicate by a first example bus 804. In some examples, the first bus 804 may be implemented by a communication bus to effectuate communication associated with one(s) of the cores 802. For example, the first bus 804 may be implemented by at least one of an Inter-Integrated Circuit (I2C) bus, a Serial Peripheral Interface (SPI) bus, a PCI bus, or a PCIe bus. Additionally or alternatively, the first bus 804 may be implemented by any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2 cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the local memory 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating-point operations. In yet other examples, the AL circuitry 816 may include first AL circuitry that performs integer-based operations and second AL circuitry that performs floating-point operations. In some examples, the AL circuitry 816 may be referred to as an Arithmetic Logic Unit (ALU).

The registers 818 are semiconductor-based structures to store data and/or instructions such as results of one or more of the operations performed by the AL circuitry 816 of the corresponding core 802. For example, the registers 818 may include vector register(s), SIMD register(s), general-purpose register(s), flag register(s), segment register(s), machine-specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure, such as by being distributed throughout the core 802 to shorten access time. The second bus 822 may be implemented by at least one of an I2C bus, a SPI bus, a PCI bus, or a PCIe bus.

Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages.

The microprocessor 800 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 800, in the same chip package as the microprocessor 800 and/or in one or more separate packages from the microprocessor 800.

Figure 9:
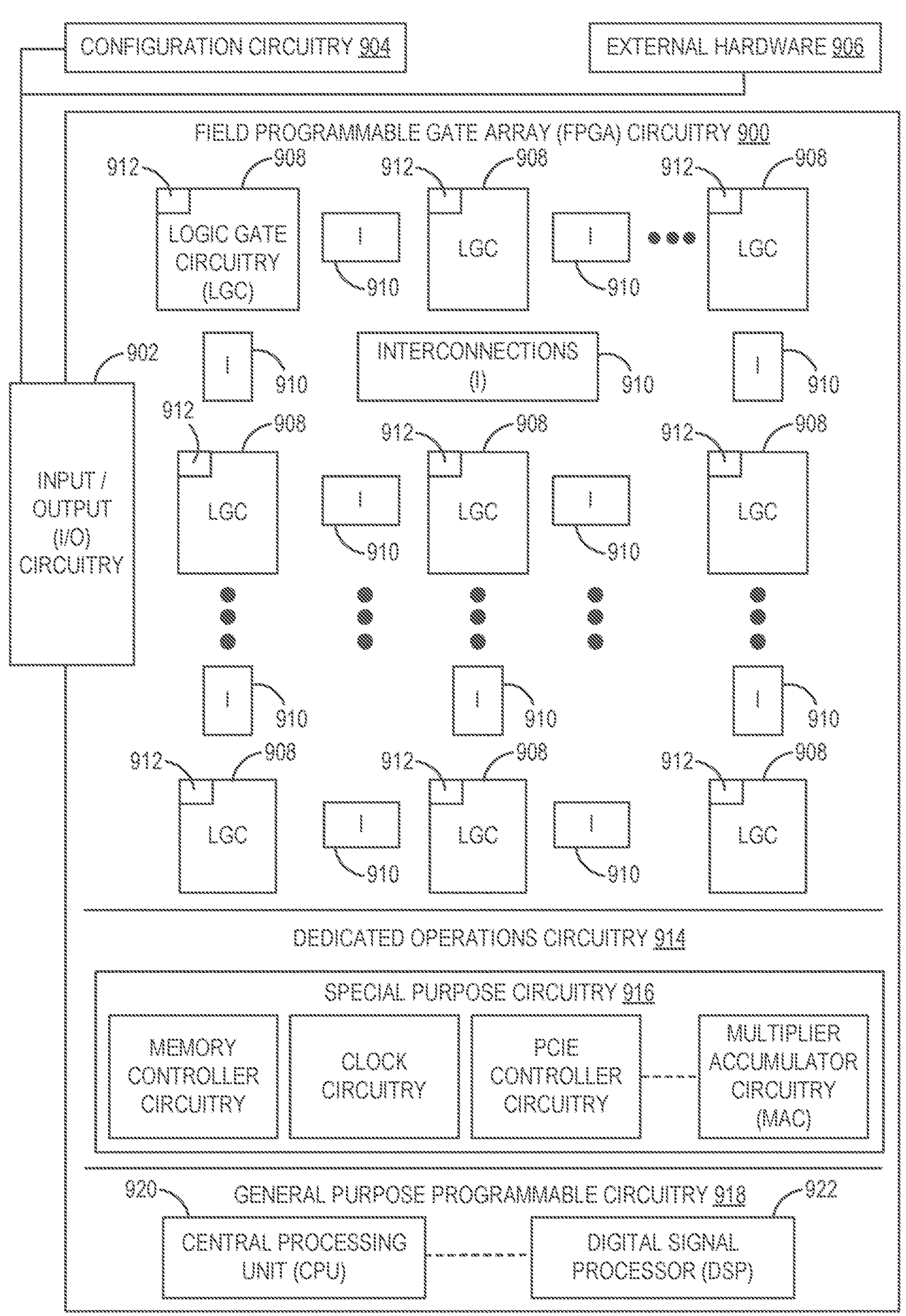
FIG. 9 is a block diagram of another example implementation of the programmable circuitry of FIG. 7.

FIG. 9 is a block diagram of another example implementation of the programmable circuitry 712 of FIG. 7. In this example, the programmable circuitry 712 is implemented by FPGA circuitry 900. For example, the FPGA circuitry 900 may be implemented by an FPGA. The FPGA circuitry 900 can be used, for example, to perform operations that could otherwise be performed by the example microprocessor 800 of FIG. 8 executing corresponding machine-readable instructions. However, once configured, the FPGA circuitry 900 instantiates the operations and/or functions corresponding to the machine-readable instructions in hardware and, thus, can often execute the operations/functions faster than they could be performed by a general-purpose microprocessor executing the corresponding software.

More specifically, in contrast to the microprocessor 800 of FIG. 8 described above (which is a general purpose device that may be programmed to execute some or all of the machine-readable instructions represented by the flowchart(s) of FIGS. 6A, 6B but whose interconnections and logic circuitry are fixed once fabricated), the FPGA circuitry 900 of the example of FIG. 9 includes interconnections and logic circuitry that may be configured, structured, programmed, and/or interconnected in different ways after fabrication to instantiate, for example, some or all of the operations/functions corresponding to the machine-readable instructions represented by the flowchart(s) of FIGS. 6A, 6B. In particular, the FPGA circuitry 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 6A, 6B. As such, the FPGA circuitry 900 may be configured and/or structured to effectively instantiate some or all of the operations/functions corresponding to the machine-readable instructions of the flowchart(s) of FIGS. 6A, 6B as dedicated logic circuits to perform the operations/functions corresponding to those software instructions in a dedicated manner analogous to an ASIC. Therefore, the FPGA circuitry 900 may perform the operations/functions corresponding to the some or all of the machine-readable instructions of FIGS. 6A, 6B faster than the general-purpose microprocessor can execute the same.

In the example of FIG. 9, the FPGA circuitry 900 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 900 of FIG. 9 may access and/or load the binary file to cause the FPGA circuitry 900 of FIG. 9 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 900 of FIG. 9 to cause configuration and/or structuring of the FPGA circuitry 900 of FIG. 9, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 900 of FIG. 9 may access and/or load the binary file to cause the FPGA circuitry 900 of FIG. 9 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 900 of FIG. 9 to cause configuration and/or structuring of the FPGA circuitry 900 of FIG. 9, or portion(s) thereof.

The FPGA circuitry 900 of FIG. 9, includes example input/output (I/O) circuitry 902 to obtain and/or output data to/from example configuration circuitry 904 and/or external hardware 906. For example, the configuration circuitry 904 may be implemented by interface circuitry that may obtain a binary file, which may be implemented by a bit stream, data, and/or machine-readable instructions, to configure the FPGA circuitry 900, or portion(s) thereof. In some such examples, the configuration circuitry 904 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 906 may be implemented by external hardware circuitry. For example, the external hardware 906 may be implemented by the microprocessor 800 of FIG. 8.

The FPGA circuitry 900 also includes an array of example logic gate circuitry 908, a plurality of example configurable interconnections 910, and example storage circuitry 912.

The logic gate circuitry 908 and the configurable interconnections 910 are configurable to instantiate one or more operations/functions that may correspond to at least some of the machine-readable instructions of FIGS. 6A, 6B and/or other desired operations. The logic gate circuitry 908 shown in FIG. 9 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations/functions. The logic gate circuitry 908 may include other electrical structures such as look-up tables (LUTs), registers (e.g., flip-flops or latches), multiplexers, etc.

The configurable interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example dedicated operations circuitry 914. In this example, the dedicated operations circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the programmable circuitry 712 of FIG. 7, many other approaches are contemplated. For example, FPGA circuitry may include an on-board CPU, such as one or more of the example CPU 920 of FIG. 8. Therefore, the programmable circuitry 712 of FIG. 7 may additionally be implemented by combining at least the example microprocessor 800 of FIG. 8 and the example FPGA circuitry 900 of FIG. 9. In some such hybrid examples, one or more cores 802 of FIG. 8 may execute a first portion of the machine-readable instructions represented by the flowchart(s) of FIGS. 6A, 6B to perform first operation(s)/function(s), the FPGA circuitry 900 of FIG. 9 may be configured and/or structured to perform second operation(s)/function(s) corresponding to a second portion of the machine-readable instructions represented by the flowcharts of FIGS. 6A, 6B, and/or an ASIC may be configured and/or structured to perform third operation(s)/function(s) corresponding to a third portion of the machine-readable instructions represented by the flowcharts of FIGS. 6A, 6B.

It should be understood that some or all of the circuitry of FIG. 2 may, thus, be instantiated at the same or different times. For example, same and/or different portion(s) of the microprocessor 800 of FIG. 8 may be programmed to execute portion(s) of machine-readable instructions at the same and/or different times. In some examples, same and/or different portion(s) of the FPGA circuitry 900 of FIG. 9 may be configured and/or structured to perform operations/functions corresponding to portion(s) of machine-readable instructions at the same and/or different times.

In some examples, some or all of the circuitry of FIG. 2 may be instantiated, for example, in one or more threads executing concurrently and/or in series. For example, the microprocessor 800 of FIG. 8 may execute machine-readable instructions in one or more threads executing concurrently and/or in series. In some examples, the FPGA circuitry 900 of FIG. 9 may be configured and/or structured to carry out operations/functions concurrently and/or in series. Moreover, in some examples, some or all of the circuitry of FIG. 2 may be implemented within one or more virtual machines and/or containers executing on the microprocessor 800 of FIG. 8.

In some examples, the programmable circuitry 712 of FIG. 7 may be in one or more packages. For example, the microprocessor 800 of FIG. 8 and/or the FPGA circuitry 900 of FIG. 9 may be in one or more packages. In some examples, an XPU may be implemented by the programmable circuitry 712 of FIG. 7, which may be in one or more packages. For example, the XPU may include a CPU (e.g., the microprocessor 800 of FIG. 8, the CPU 920 of FIG. 9, etc.) in one package, a DSP (e.g., the DSP 922 of FIG. 9) in another package, a GPU in yet another package, and an FPGA (e.g., the FPGA circuitry 900 of FIG. 9) in still yet another package.

Figure 10:
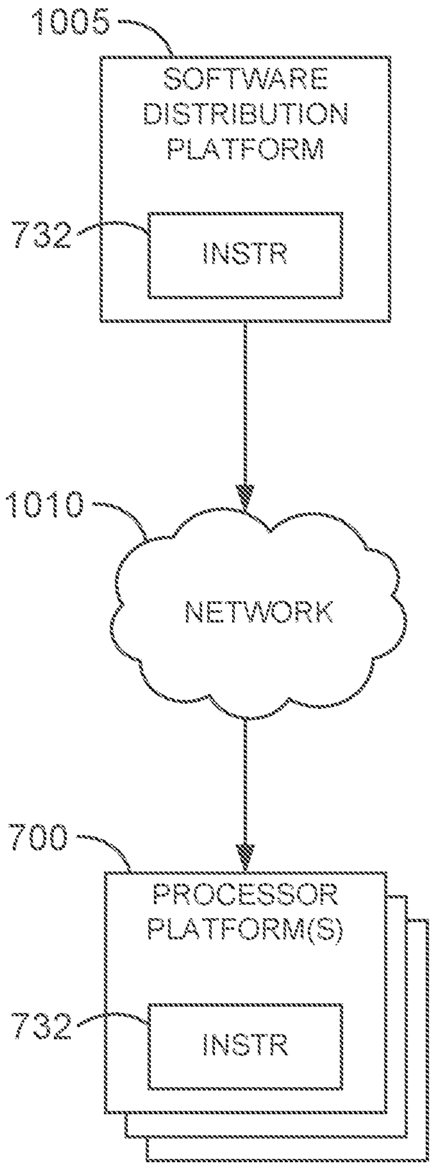
FIG. 10 is a block diagram of an example software/firmware/instructions distribution platform (e.g., one or more servers) to distribute software, instructions, and/or firmware (e.g., corresponding to the example machine-readable instructions of FIG. 6) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine-readable instructions 732 of FIG. 7 to other hardware devices (e.g., hardware devices owned and/or operated by third parties from the owner and/or operator of the software distribution platform) is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine-readable instructions 732 of FIG. 7. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine-readable instructions 732, which may correspond to the example machine-readable instructions of FIGS. 6A, 6B, as described above. The one or more servers of the example software distribution platform 1005 are in communication with an example network 1010, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third-party payment entity. The servers enable purchasers and/or licensors to download the machine-readable instructions 732 from the software distribution platform 1005. For example, the software, which may correspond to the example machine-readable instructions of FIGS. 6A, 6B, may be downloaded to the example programmable circuitry platform 700, which is to execute the machine-readable instructions 732 to implement the example fragment coordinator 202, the example spill manager 204, and/or the example I/O manager 206 of FIG. 2. In some examples, one or more servers of the software distribution platform 1005 periodically offer, transmit, and/or force updates to the software (e.g., the example machine-readable instructions 732 of FIG. 7) to ensure improvements, patches, updates, etc., are distributed and applied to the software at the end user devices. Although referred to as software above, the distributed "software" could alternatively be firmware.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real-world imperfections as will be understood by persons of ordinary skill in the art. For example, "approximately" and "about" may indicate such dimensions may be within a tolerance range of +/−10% unless otherwise specified herein.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific integrated circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that implement an adaptive and/or service level agreement (SLA) aware paging system. Disclosed systems, apparatus, articles of manufacture, and methods improve the efficiency of using a computing device by storing spilled data in spill data stores based on data relevancy (e.g., cross-data relevancy organization) and efficiently reading pages in batches (e.g., blocks) from spill data stores. In this manner, examples disclosed herein reduce remote input-output (I/O) communications, thereby conserving network resources. Disclosed systems, apparatus, articles of manufacture, and methods are accordingly directed to one or more improvement(s) in the operation of a machine such as a computer or other electronic and/or mechanical device.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
- interface circuitry;
- machine-readable instructions; and
- programmable circuitry to at least one of instantiate or execute the machine-readable instructions to:
  - write pages of data to blocks, the data partitioned into the blocks by an operator;
  - write the blocks to a file based on a sequential arrangement of the data in the blocks;
  - write the file to a spill data store; and
  - batch read the blocks in sequential order from the spill data store to a local memory, the batch read in response to a request associated with the operator that partitioned the data into the blocks, the request to access a first one of the blocks, the batch read to prefetch a second one of the blocks not yet requested by the operator, the second one of the blocks to be subsequently processed by the operator.

2. The apparatus of claim 1, wherein the programmable circuitry is to at least one of dynamically or adaptively determine a size of the blocks based on at least one of an operator type, an amount or volume of data, a spill tier characteristic and latency, or a service level agreement (SLA).

3. The apparatus of claim 1, wherein the programmable circuitry is to at least one of dynamically or adaptively determine a size of the blocks based on an access pattern, the access pattern including at least one of a sequential read/write pattern, a data objects relationship, or a frequency of accesses.

4. The apparatus of claim 1, wherein the programmable circuitry is to select the spill data store for the file from a plurality of spill data store tiers based on a service level agreement (SLA) or a frequency of access of the data.

5. The apparatus of claim 1, wherein the data is raw data, the programmable circuitry is to apply the operator on at least a portion of the raw data to generate intermediate data.

6. The apparatus of claim 1, wherein the programmable circuitry is to write the pages of the data to the blocks based on a spill instruction in the operator that is to process the data.

7. The apparatus of claim 1, wherein the programmable circuitry is to communicate with a hierarchy of secondary storage tiers with different input/output and latency characteristics and to which the data is to be paged out.

8. The apparatus of claim 1, wherein the programmable circuitry includes one or more of:
- at least one of a central processor unit, a graphics processor unit, or a digital signal processor, the at least one of the central processor unit, the graphics processor unit, or the digital signal processor having control circuitry to control data movement within the programmable circuitry, arithmetic and logic circuitry to perform one or more first operations corresponding to machine-readable data, and one or more registers to store a result of the one or more first operations, the machine-readable data in the apparatus;
- a Field Programmable Gate Array (FPGA), the FPGA including first logic gate circuitry, a plurality of configurable interconnections, and storage circuitry, the first logic gate circuitry and the plurality of the configurable interconnections to perform one or more second operations, the storage circuitry to store a result of the one or more second operations; or
- an Application Specific Integrated Circuit (ASIC) including second logic gate circuitry to perform one or more third operations.

9. A non-transitory computer-readable medium comprising instructions to cause programmable circuitry to at least:
- write pages of data to blocks, the data partitioned into the blocks by an operator;
- write the blocks to a file based on a sequential arrangement of the data in the blocks;
- write the file to a spill data store; and
- batch read the blocks in sequential order from the spill data store to a local memory, the batch read in response to a request to access a first one of the blocks for the operator that partitioned the data into the blocks, the batch read to prefetch a second one of the blocks not yet requested for the operator, the second one of the blocks to be subsequently processed by the operator.

10. The non-transitory computer-readable medium of claim 9, wherein the instructions are to cause the programmable circuitry to at least one of dynamically or adaptively determine a size of the blocks based on at least one of an operator type, an amount or volume of data, a spill tier characteristic and latency, or a service level agreement (SLA).

11. The non-transitory computer-readable medium of claim 9, wherein the instructions are to cause the programmable circuitry to at least one of dynamically or adaptively determine a size of the blocks based on an access pattern, the access pattern including at least one of a sequential read/write pattern, a data objects relationship, or a frequency of accesses.

12. The non-transitory computer-readable medium of claim 9, wherein the instructions are to cause the programmable circuitry to select the spill data store for the file from a plurality of spill data store tiers based on a service level agreement (SLA) or a frequency of access of the data.

13. The non-transitory computer-readable medium of claim 9, wherein the data is intermediate data, the instructions to cause the programmable circuitry to apply the operator on at least a portion of raw data to generate the intermediate data.

14. The non-transitory computer-readable medium of claim 9, wherein the instructions are to cause the programmable circuitry to write the pages of the data to the blocks based on a spill instruction in the operator that is to process the data.

15. The non-transitory computer-readable medium of claim 9, wherein the instructions are to cause the programmable circuitry to communicate with a hierarchy of secondary storage tiers to which the data is to be paged out, the hierarchy of secondary storage tiers including different input/output and latency characteristics.

16. A method comprising:

writing pages of data to blocks, the data partitioned into the blocks by an operator;

writing the blocks to a file based on a sequential arrangement of the data in the blocks;

writing the file to a spill data store; and executing an instruction by programmable circuitry to batch read the blocks in sequential order from the spill data store to a local memory, the batch read in response to a request associated with the operator that partitioned the data into the blocks, the request to access a first one of the blocks, the batch read to prefetch a second one of the blocks not yet requested for the operator, the second one of the blocks to be subsequently processed by the operator.

17. The method of claim 16, comprising dynamically or adaptively determining a size of the blocks based on at least one of an operator type, an amount or volume of data, a spill tier characteristic and latency, or a service level agreement (SLA).

18. The method of claim 16, comprising dynamically or adaptively determining a size of the blocks based on an access pattern, the access pattern including at least one of a sequential read/write pattern, a data objects relationship, or a frequency of accesses.

19. The method of claim 16, comprising selecting the spill data store for the file from a plurality of spill data store tiers based on a service level agreement (SLA) or a frequency of access of the data.

20. The method of claim 16, comprising applying the operator on at least a portion of the data to generate intermediate data.

21. The method of claim 16, wherein the writing of the pages of the data to the blocks is based on a spill instruction in the operator that is to process the data.

22. The method of claim 16, comprising communicating with a hierarchy of secondary storage tiers to which the data is to be paged out, the hierarchy of secondary storage tiers including different input/output and latency characteristics.

* * * * *